United States Patent
Trehan et al.

(10) Patent No.: US 10,534,542 B2
(45) Date of Patent: Jan. 14, 2020

(54) DYNAMIC CORE ALLOCATION FOR CONSISTENT PERFORMANCE IN A NON-PREEMPTIVE SCHEDULING ENVIRONMENT

(71) Applicant: HEWLETT PACKARD ENTERPRISE DEVELOPMENT LP, Houston, TX (US)

(72) Inventors: Sagar Trehan, San Jose, CA (US); Gurunatha Karaje, San Jose, CA (US); Zhaosheng Zhu, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/445,919

(22) Filed: Feb. 28, 2017

(65) Prior Publication Data

US 2017/0177221 A1 Jun. 22, 2017

Related U.S. Application Data

(63) Continuation-in-part of application No. 15/270,791, filed on Sep. 20, 2016, which is a continuation-in-part (Continued)

(51) Int. Cl.
*G06F 9/46* (2006.01)
*G06F 3/06* (2006.01)

(52) U.S. Cl.
CPC .................................. *G06F 3/061* (2013.01)

(58) Field of Classification Search
CPC ...... G06F 3/0685; G06F 3/0688; G06F 3/065; G06F 3/0659; G06F 9/4881;
(Continued)

(56) References Cited

U.S. PATENT DOCUMENTS 6,675,190 B1  1/2004  Schabernack et al.
6,938,256 B2 * 8/2005  Deng .................... G06F 9/5044
                                                       718/104

(Continued)

OTHER PUBLICATIONS

Pure Storage, Inc., "The Purity Operating Environment: Storage software born for flash," Jul. 26, 2013, <https://web.archive.org/web/20130726212513/http://www.purestorage.com/flash-array/purity.html>.

*Primary Examiner* — Camquy Truong
(74) *Attorney, Agent, or Firm* — Hewlett Packard Enterprise Patent Department

(57) ABSTRACT

Methods and systems are presented for allocating resources based on dynamic core allocation in a scheduler hierarchy of a storage system. One method includes reserving a set of core processors including one or more core processors for execution of system IOs in the data storage system. The data storage system includes a controller including non-volatile memory (NVRAM) for handling IOs and a first central processing unit (CPU) having a plurality of core processors, a solid state memory (SSD) configured as a read cache memory, and permanent data storage. The method includes dynamically adjusting the number of core processors in the set based on a current utilization of a resource. The method includes scheduling an IO on a first core processor of the plurality of core processors that has the least magnitude of scheduled utilization.

23 Claims, 23 Drawing Sheets

Related U.S. Application Data of application No. 14/748,179, filed on Jun. 23, 2015, now Pat. No. 9,483,187.

(60) Provisional application No. 62/058,015, filed on Sep. 30, 2014.

(58) Field of Classification Search
CPC .............. G06F 9/5038; H04L 67/1097; H04L 67/2842; H04L 67/32; H04L 67/322
See application file for complete search history.

(56) References Cited

U.S. PATENT DOCUMENTS

| | | |
|---|---|---|
| 7,334,162 B1 | 2/2008 | Vakrat et al. |
| 7,783,852 B2 | 8/2010 | Lahiri et al. |
| 7,941,527 B1 | 5/2011 | Jacoby et al. |
| 8,041,808 B1 | 10/2011 | Becker |
| 8,458,509 B1 | 6/2013 | Sreegiriraju et al. |
| 8,848,723 B2 | 9/2014 | Sundararaman et al. |
| 9,160,684 B2 | 10/2015 | Sundararaman et al. |
| 9,367,366 B2 | 6/2016 | Xiong et al. |
| 9,558,250 B2 | 1/2017 | Sun et al. |
| 9,871,855 B2 | 1/2018 | Likhtarov et al. |
| 2004/0181594 A1 | 9/2004 | Suleiman |
| 2006/0280119 A1 | 12/2006 | Karamanolis et al. |
| 2007/0064711 A1 | 3/2007 | Wang et al. |
| 2007/0226332 A1 | 9/2007 | Becker-Szendy et al. |
| 2008/0222311 A1 | 9/2008 | Lee et al. |
| 2009/0164274 A1* | 6/2009 | Narayanaswamy ... G06Q 10/06 705/70 |
| 2010/0083262 A1 | 4/2010 | Gulati et al. |
| 2010/0162253 A1 | 6/2010 | Jeong |
| 2011/0265083 A1* | 10/2011 | Davis .................. G06F 12/0866 718/1 |
| 2011/0314182 A1 | 12/2011 | Muppirala et al. |
| 2012/0020368 A1 | 1/2012 | Sundararaman et al. |
| 2012/0023498 A1 | 1/2012 | Sundararaman et al. |
| 2012/0060168 A1 | 3/2012 | Lee et al. |
| 2012/0063313 A1 | 3/2012 | Zhou et al. |
| 2013/0326064 A1 | 12/2013 | Gulati et al. |
| 2014/0130055 A1 | 5/2014 | Guha |
| 2014/0281121 A1* | 9/2014 | Karamcheti ............ G06F 3/061 711/102 |
| 2015/0373049 A1 | 12/2015 | Sharma et al. |
| 2016/0021172 A1 | 1/2016 | Mahadevan |
| 2016/0044126 A1 | 2/2016 | Mahadevan et al. |
| 2016/0077571 A1* | 3/2016 | Sagar .................... G06F 1/3206 713/340 |
| 2016/0092108 A1 | 3/2016 | Karaje et al. |
| 2016/0092272 A1 | 3/2016 | Karaje et al. |
| 2016/0275422 A1 | 9/2016 | Chape et al. |
| 2016/0291885 A1 | 10/2016 | Pendharkar et al. |
| 2017/0010919 A1 | 1/2017 | Yerfule et al. |
| 2017/0132040 A1 | 5/2017 | Yerfule et al. |
| 2017/0177221 A1 | 6/2017 | Trehan et al. |
| 2017/0177222 A1 | 6/2017 | Singh et al. |
| 2017/0286516 A1 | 10/2017 | Horowitz et al. |
| 2017/0293426 A1 | 10/2017 | Karaje et al. |
| 2018/0067771 A1 | 3/2018 | Frandzel et al. |
| 2018/0081832 A1 | 3/2018 | Longo et al. |
| 2018/0267728 A1 | 9/2018 | Booth et al. |

* cited by examiner

DYNAMIC CORE ALLOCATION FOR CONSISTENT PERFORMANCE IN A NON-PREEMPTIVE SCHEDULING ENVIRONMENT

CROSS REFERENCE TO RELATED APPLICATIONS

This application is a continuation-in-part and claims priority to and the benefit of commonly assigned, co-pending U.S. patent application Ser. No. 15/270,791, entitled "Dynamic Weight Accumulation for Fair Allocation of Resources in a Scheduler Hierarchy," filed on Sep. 20, 2016; which is a continuation-in-part and claims priority to and the benefit of commonly assigned, co-pending U.S. patent application Ser. No. 14/748,179, entitled "Quality of Service Implementation in a Networked Storage System with Hierarchical Schedulers," filed on Jun. 23, 2015; which claims priority to and the benefit of U.S. Provisional Patent Application Ser. No. 62/058,015, entitled "Quality of Service Implementation in a Networked Storage System with Hierarchical Structures," filed on Sep. 30, 2014, all of which are hereby incorporated by reference in their entireties.

TECHNICAL FIELD

The present embodiments relate to methods, systems, and programs for allocating resources in a data storage system, and more particularly, methods, systems, and computer programs for allocating resources based on dynamic core allocation in a scheduler hierarchy of a data storage system.

BACKGROUND

Network storage, also referred to as network storage systems or data storage systems, is computer data storage connected to a computer network providing data access to heterogeneous clients. Typically, network storage systems process a large amount of Input/Output (IO) requests, and high availability, speed, and reliability are desirable characteristics of network storage. In recent times, predictable performance (aka consistent performance) has become another desirable trait of network storage. Network storage performance is said to be consistent if all user IOs complete within a predictable time. In addition to processing read and write IO requests, network storage systems need to perform other system and/or background operations required for maintaining these systems, such as garbage collection of obsolete data and compaction of data (e.g., merging contents of two half-filled segments into one full segment), creating snapshots of data, backup, and replication procedures, etc.

However, a networked storage device having non-preemptive schedulers may have user IOs waiting for resources while long-running system or background tasks are consuming resources. In a non-preemptive scheduler hierarchy, tasks that have already been scheduled (e.g., assigned resources) cannot be stopped and reassigned resources. That is, tasks once scheduled are allowed to run either to completion or to a point where task may voluntarily relinquish the resource. As a result, user IOs experience arbitrary delays which affect the predictability of response time and hence affecting performance consistency. As such, even a high priority, short-lived task must wait for resources that are being consumed by long-running low priority tasks.

What are needed are a network storage device, software, and systems that provide for better utilization of system resources to enable a storage system to process IOs with high and consistent performance.

It is in this context that embodiments arise.

SUMMARY

The present embodiments relate to solving one or more problems found in the related art, and specifically to provide for fair utilization of system resources of a data storage system. In particular, methods and systems are presented for allocating resources based on dynamic core allocation (DCA) in a scheduler hierarchy of a data storage system. It should be appreciated that the present embodiments can be implemented in numerous ways, such as a method, an apparatus, a system, a device, or a computer program on a computer readable medium. Several embodiments are described below.

In one embodiment, a method for allocating resources is disclosed and includes reserving a set of core processors including one or more core processors for execution of system inputs/outputs (IOs) in a data storage system. The data storage system includes a controller including non-volatile memory (NVRAM) for handling IOs and a central processing unit (CPU) having a plurality of core processors, a solid state memory (SSD) configured as a read cache memory, and permanent data storage. The plurality of core processors includes the set of core processors. The method includes dynamically adjusting the number of core processors in the set based on a current utilization of a resource. The method includes scheduling an IO on a first core processor of the plurality of core processors that has the least magnitude of scheduled utilization.

In another embodiment, a non-transitory computer-readable storage medium, storing a computer program for allocating resources is disclosed, such that fair allocation of resources is achieved in a scheduler hierarchy to smooth the latency of performing short-lived user IOs, such that the latency is consistent within a specified range. The storage medium includes program instructions configured for reserving a set of core processors including one or more core processors for execution of system IOs in a data storage system. The data storage system includes a controller including NVRAM for handling IOs and a CPU having a plurality of core processors, a SSD configured as a read cache memory, and permanent data storage. The storage medium includes program instructions configured for dynamically adjusting the number of core processors in the set based on a current utilization of a resource. The storage medium includes program instructions configured for scheduling an IO on a first core processor of the plurality of core processors that has the least magnitude of scheduled utilization.

In another embodiment, a data storage system includes a controller including NVRAM for handling IOs and a CPU including a plurality of core processors. The data storage system includes a solid state drive/memory (SSD) configured as a read cache memory, and permanent data storage (e.g., SSDs or hard disk drives—HDDs). The data storage system includes a scheduler hierarchy for scheduling IOs on the plurality of core processors. During resource allocation, the scheduler hierarchy is configured to reserve a set of core processors including one or more core processors for execution of system IOs in a data storage system. The scheduler hierarchy is further configured to dynamically adjust the number of core processors in the set based on a current utilization of a resource. The scheduler hierarchy is further configured to schedule an IO on a first core processor of the plurality of core processors that has the least magnitude of scheduled utilization.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods that provide for performing dynamic weight accumulation of schedulers in a scheduler hierarchy to achieve fair allocation of resources. In particular, schedulers in a scheduler hierarchy allocate resources to its child schedulers fairly based on weights through dynamic weight accumulation, wherein weights are propagated throughout the scheduler hierarchy in a bottom-up fashion. Specifically, dynamic weight accumulation is performed by calculating a weight of a corresponding scheduler of a corresponding level by using its own weight multiplier and accumulating weights of its active child schedulers at all lower levels. The newly calculated weight for the corresponding scheduler is propagated to its parent scheduler in order to demand its proper share of resources from the root of the scheduler hierarchy.

With the above general understanding of the various embodiments, example details of the embodiments will now be described with reference to the various drawings. Similarly numbered elements and/or components in one or more figures are intended to generally have the same configuration and/or functionality. It will be apparent, that the present embodiments may be practiced without some or all of these specific details. In other instances, well-known process operations have not been described in detail in order not to unnecessarily obscure the present embodiments.

Dynamic Weight Accumulation

Figure 1:
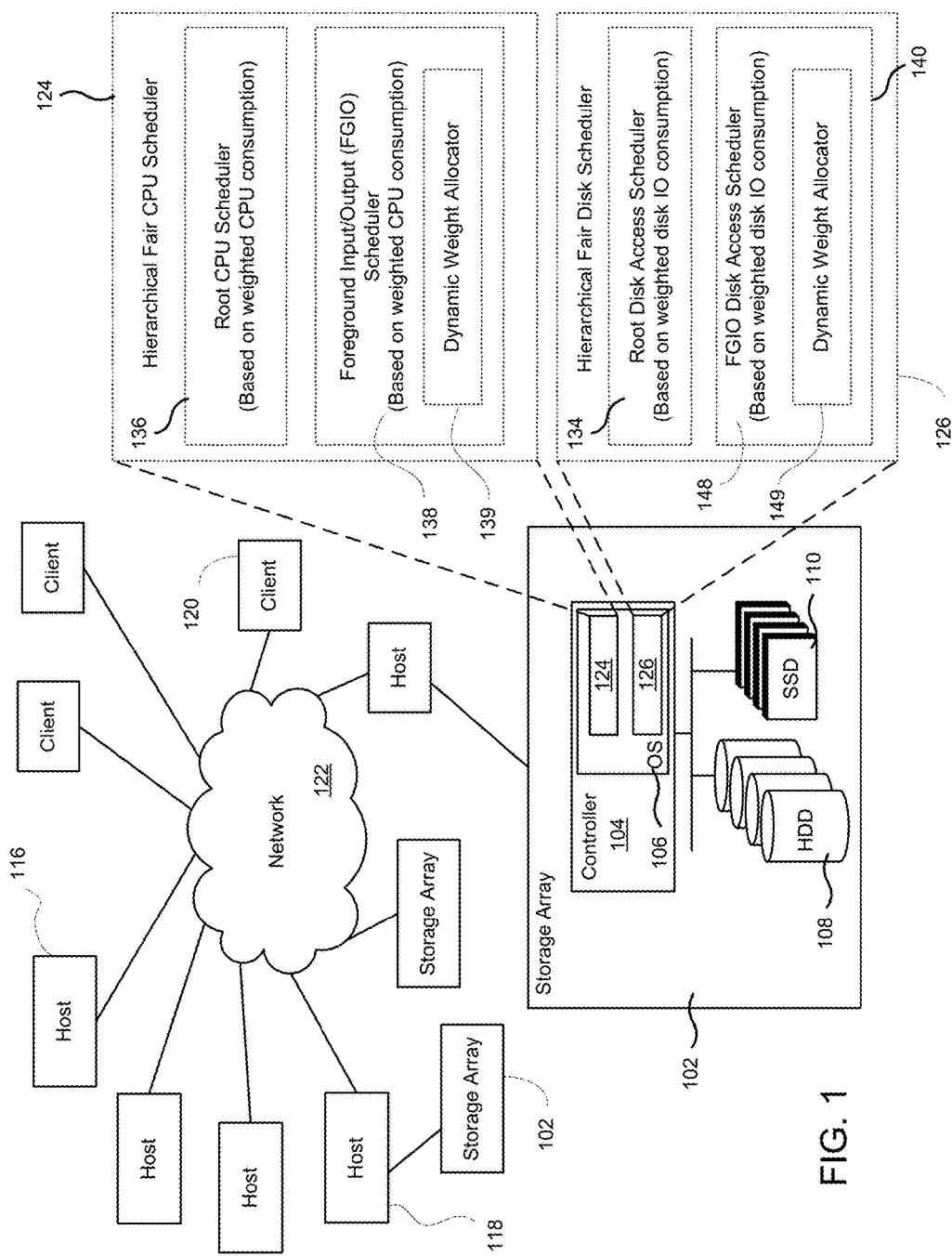
FIG. 1 depicts a system with network storage, in accordance with one embodiment of the present disclosure.

FIG. 1 depicts a system with network storage, according to one embodiment. The networked storage device, also referred to herein as a storage array 102 or a data storage system, includes a controller 104 with a storage operating system 106, which is a multitasking system able to execute several tasks concurrently. One or more tasks are configured to process IO requests, and these tasks that process IOs are referred to herein as foreground tasks. Background tasks are tasks that do not cause a host initiator to wait for their output. For example, background tasks may include system maintenance tasks (e.g., processing an alert when resource consumption reaches a threshold, taking a scheduled snapshot, garbage collection (GC), etc.). More particularly, the operating system 106 is configured to perform fair utilization of system resources in a data storage system, wherein the allocation of resources is based on dynamic weight accumulation that is performed in a bottom-up fashion (e.g., weights of schedulers are propagated upwards) in a scheduler hierarchy.

In the example architecture of FIG. 1, one or more storage arrays 102 provide storage services to one or more servers 116, 118 (which are referred herein as hosts) and to one or more clients 120. The configuration will depend on the implementation of the storage array and the demand by application. Network 122 provides transport for the data exchanges between the storage array 102 and servers 116, 118 or clients 120. In addition, server 118 may be directly connected to a storage array without communicating through network 122. Storage array 102 includes one or more memory controllers 104, one or more hard disk drives (HDD) 108, and one or more solid state drives (SSD) 110, also referred to herein as flash cache. Additional examples regarding the system are provided below. In one embodiment, the storage operating system 106 executing in the controller 104 includes a hierarchical fair CPU scheduler 124 and/or a hierarchical fair disk scheduler 126. For example, the hierarchical fair CPU scheduler 124 is configured for allocating resources (e.g., CPU cycles) based on dynamic weight accumulation of schedulers in a scheduler hierarchy of a data storage system, wherein weights are propagated upwards through the scheduler hierarchy. Similarly, the hierarchical fair disk scheduler 128 is configured for allocating disk access based on the same dynamic weight accumulation technique. In one embodiment, schedulers 124 and 126 are implemented within a quality of service (QoS) manager In one embodiment, the hierarchical fair CPU scheduler 124 includes at least a root CPU scheduler 136 that is configured to allocate CPU resources to the data storage system. In one embodiment, the root CPU scheduler 136 includes a task scheduler that allocates CPU resources to the different tasks, foreground or background, based on various factors including the amount of CPU cycles, or any other metric related to CPU consumption utilized during execution of different tasks. In another embodiment, the root CPU scheduler 136 includes a data-access scheduler that allocates IO resources to different applications accessing the storage array based on the data being processed (e.g., based on the megabytes per second consumed by different applications, or throughput, or amount of data processed, etc.). The use of a task scheduler and/or data-access scheduler provides various combinations of determining how resources should be allocated at the root level. A dual currency system is implemented when both the task scheduler and data access scheduler are used for allocating resources in the data storage system, because two different types of metrics are utilized for the allocation resources. It is noted that there can be also other types of schedulers in the hierarchical fair CPU scheduler 124 that utilize different scheduling criteria, such as first come first serve, etc.

In addition, the hierarchical fair CPU scheduler 124 includes a foreground input/output (FGIO) scheduler 138 that is configured to fairly allocate the CPU resources assigned by the root CPU scheduler 136 to execute foreground tasks based on weights of the schedulers in a scheduler hierarchy. In particular, the dynamic weight allocator 139 performs dynamic weight accumulation of schedulers of a data storage system to determine the weights of schedulers in a scheduler hierarchy, wherein weights are propagated upwards through the scheduler hierarchy. Weights of leaf schedulers in the scheduler hierarchy are propagated upwards only till the children of the FGIO scheduler 138, and not to the FGIO scheduler 138. In that manner, static distribution of resources is maintained between foreground tasks (scheduled by FGIO scheduler 138) and background tasks. As such, dynamic weight accumulation (DWAC) of embodiments does not affect background tasks at all, and is configured to manage the fair distribution of shares allocated to the foreground tasks.

In one embodiment, the operating system 106 of controller 104 also includes a hierarchical fair disk scheduler 126. Similar to the hierarchical fair CPU scheduler 124, fair disk scheduler 126 is configured to allocate disk access based on dynamic weight accumulation of schedulers in a scheduler hierarchy of a data storage system, wherein weights are propagated upwards through the scheduler hierarchy. In particular, the hierarchical fair disk scheduler 126 includes a root disk access scheduler 134 that is configured to allocate disk access based on the weighted disk IO consumption of various foreground and background tasks. A FGIO disk access scheduler 149 is configured to fairly allocate the disk access assigned to foreground tasks by the root disk access scheduler 134 based on weights of schedulers in a scheduler hierarchy, wherein weights are determined through dynamic weight accumulation of embodiments of the present invention. Weights of leaf schedulers in the scheduler hierarchy are propagated upwards only till the children of the FGIO scheduler 148, and not to the FGIO scheduler 148. In that manner, static distribution of resources is maintained between foreground tasks (scheduled by FGIO scheduler 148) and background tasks. While embodiments of the present invention are described with the reference to the hierarchical fair CPU scheduler 124 to illustrate dynamic weight accumulation, the same principles may be applied to the hierarchical fair disk scheduler 126. In still other embodiments, the methods for achieving fairness disclosed herein can be used in any environment requiring fair treatment, such as a networking environment using hierarchical schedulers to route packets, or in a memory allocator having hierarchical allocators to allocate memory, etc.

Figure 2:
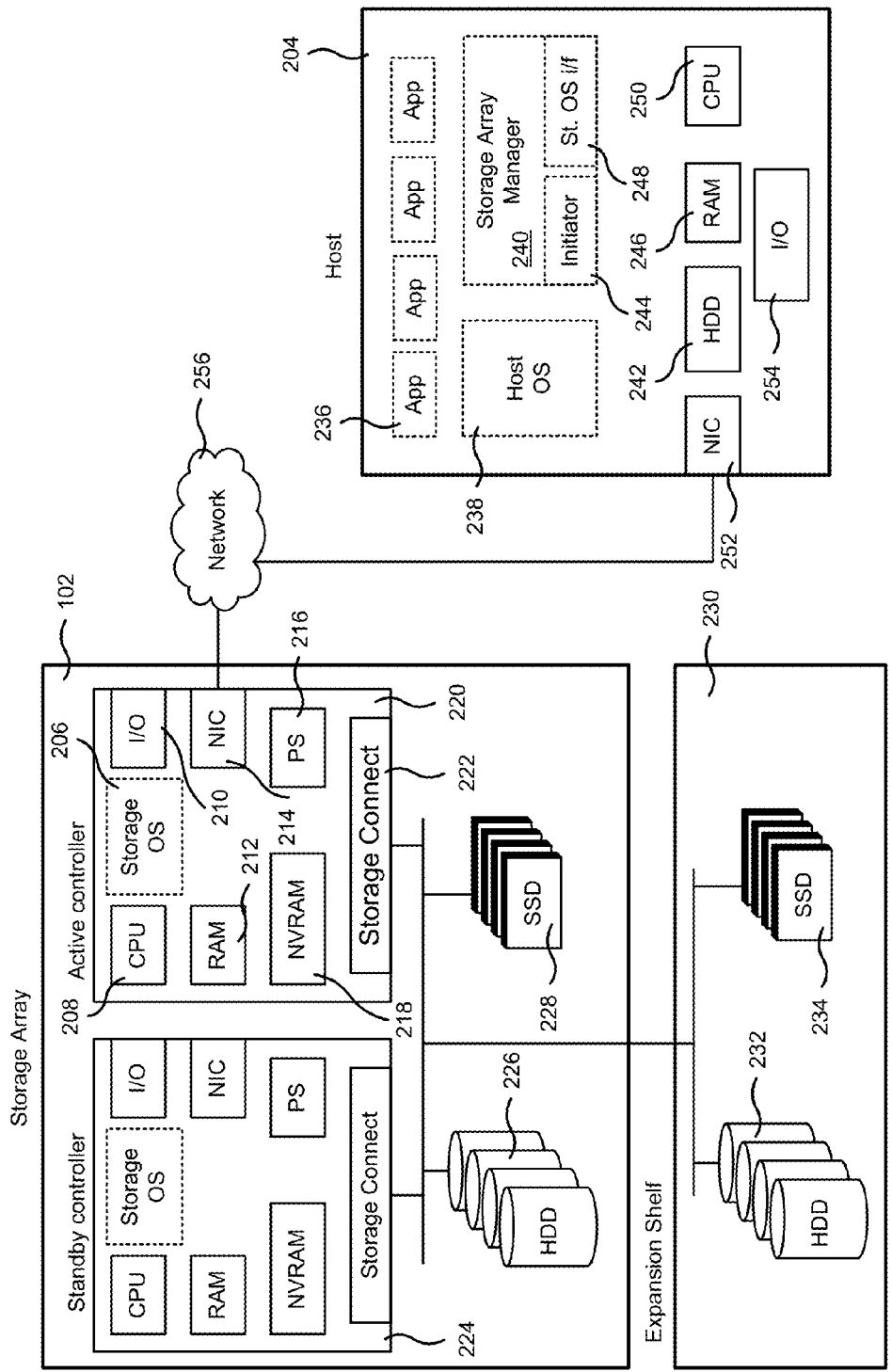
FIG. 2 illustrates the architecture of a storage array, in accordance with one embodiment of the present disclosure.

FIG. 2 illustrates an example architecture of a storage array 102, according to one embodiment. In one embodiment, storage array 102 includes an active controller 220, a standby controller 224, one or more HDDs 226, and one or more SSDs 228. It is important to note that either controller can operate in the active mode, and either controller can operate in the standby mode, such that when both controllers are on-line one controller is designated as the active controller and functions to service IOs from one or more hosts, while the other controller remains in standby mode ready to step in and handle the IOs when a failure (real or instantiated) to the active controller occurs. As such, the active controller 220 and the standby controller 224 are configured similarly and mirrored appropriately, such that either controller when designated active can access (e.g., write, read, etc.) data stored in any of the storage mediums of the storage array 102, including a corresponding NVRAM, read cache SSD 228, and HDD 226 to serve IOs from hosts. In one embodiment, the active controller 220 includes NVRAM 218, which in one implementation is used for immediately storing the incoming data (e.g., write data) as it arrives to the storage array. In that manner, storage array 102 provides immediate acknowledgment of a write request to the requesting host. After the data is processed (e.g., compressed and organized in segments (e.g., coalesced)), the data is transferred from the NVRAM 218 to HDD 226, or to read cache SSD 228 if the data is determined to be cache worthy, or to both.

The active controller 220 includes various components that enable efficient processing of read and write requests. For instance, data from a write operation is stored first in the NVRAM 218 of active controller 220, and provides for immediate acknowledgment of acceptance and storage of the data back to the host, thereby providing increased storage system performance. Because the data is later stored in HDD 226 and/or SSD 228, a later read access will retrieve the data from the location giving the quickest access. For example, the data is retrieved from NVRAM 218 for the quickest response time if the data is still available. Further description of the operations performed during write and read requests is provided in relation to FIGS. 3 and 4.

In addition, the active controller 220 further includes CPU 208, general-purpose RAM 212 (e.g., used by the programs executing in CPU 208), input/output module 210 for communicating with external devices (e.g., USB port, terminal port, connectors, plugs, links, etc.), one or more network interface cards (NICs) 214 for exchanging data packages through network 256, one or more power supplies 216, a temperature sensor (not shown), and a storage connect module 222 for sending and receiving data to and from the HDD 226 and SSD 228. In one embodiment, active controller 220 is configured to perform fair utilization of system resources, including allocating resources (e.g., CPU cycles, disk access, etc.) based on dynamic weight accumulation that is performed in a bottom-up fashion in a scheduler hierarchy of a data storage system (e.g., weights of schedulers are propagated upwards through the scheduler hierarchy). In one embodiment, standby controller 224 includes the same components as active controller 220.

In one embodiment, bus 290 provides connectivity between the components of the active controller 220 and the components of the standby controller 224, for example to implement an active/standby array configuration, wherein the active controller 220 services IO requests from one or more hosts and the standby controller 224 services write cache mirroring requests (e.g., mirrors writes to NVRAM 218 to NVRAM 299) while remaining ready to assume the primary responsibility of servicing IOs when a failure occurs at the active controller 220.

Active controller 220 is configured to execute one or more computer programs stored in RAM 212. One of the computer programs is the storage operating system (OS) used to perform operating system functions for the active controller device. In some implementations, one or more expansion shelves 230 may be coupled to storage array 102 to increase HDD 232 capacity, or SSD 234 capacity, or both.

In one embodiment, active controller 220 and standby controller 224 have their own NVRAMs, but they share HDDs 226 and SSDs 228. The standby controller 224 receives copies of what gets stored in the NVRAM 218 of the active controller 220 and stores the copies in its own NVRAM 299. If the active controller 220 fails, standby controller 224 takes over the management of the storage array 102. For example, one or both of the failover managers 134 in the controllers 220 and 224 implement and/or manage the failover process. When servers, also referred to herein as hosts, connect to the storage array 102, read/write requests (e.g., IO requests) are sent over network 256, and the storage array 102 stores the sent data or sends back the requested data to host 204.

Host 204 is a computing device including a CPU 250, memory (RAM) 246, permanent storage (HDD) 242, a NIC card 252, and an IO module 254. The host 204 includes one or more applications 236 executing on CPU 250, a host operating system 238, and a computer program storage array manager 240 that provides an interface for accessing storage array 102 to applications 236. Storage array manager 240 includes an initiator 244 and a storage OS interface program 248. When an IO operation is requested by one of the applications 236, the initiator 244 establishes a connection with storage array 102 in one of the supported formats (e.g., iSCSI, Fibre Channel, or any other protocol). The storage OS interface 248 provides console capabilities for managing the storage array 102 by communicating with the active controller 220 and the storage OS 206 executing therein.

To process IO requests, resources from the storage array 102 are required. Some of these resources may be a bottleneck in the processing of storage requests because the resources are over utilized, or are slow, or for any other reason. In general, the CPU and the hard drives of the storage array 102 can become over-utilized and become performance bottlenecks. For example, the CPU may become very busy because the CPU is utilized for processing storage IO requests while also performing background tasks, such as garbage collection, snapshots, replication, alert reporting, etc. In one example, if there are many cache hits (i.e., the SSD contains the requested data during IO requests, the SSD cache, which is a fast responding system may press the CPU for cycles, thus causing potential bottlenecks for other requested IOs or for processing background operations. The hard disks may also become a bottleneck because the inherent access speed to data is slow when compared to accessing data from emery (e.g., NVRAM) or SSD 228. Embodiments of the present invention are able to reduce bottlenecks at the CPU and/or HDD, by ensuring that the CPU or disk access resources assigned to various tasks are allocated fairly through a scheduler hierarchy by implementing dynamic weight accumulation, such that weights of schedulers are propagated upwards through the scheduler hierarchy. This provides for efficient use of resources, thereby reducing the overall cost and use of those resources when met with a given demand.

More details are provided below regarding example elements in FIGS. 1 and 2 with reference to FIGS. 3-10. It should be understood, however, that specific implementations may utilize different modules, different protocols, different number of controllers, etc., while still being configured to execute or process operations taught and disclosed herein. As such, the example structure of FIG. 2 should not be interpreted to be exclusive or limiting, but rather exemplary or illustrative.

Figure 3:
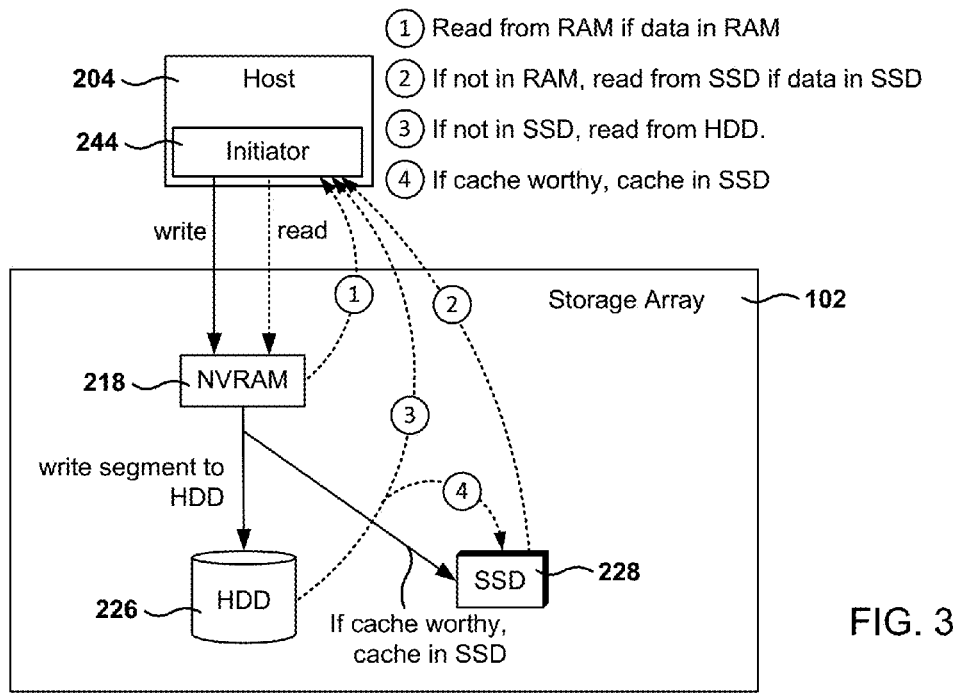
FIG. 3 illustrates read and write paths within the storage array, in accordance with one embodiment of the present disclosure.

FIG. 3 illustrates read and write paths within the storage array 102, according to one embodiment. Regarding the write path, the initiator 244 in the host 204 sends the write request to the storage array 102. As the write data comes in, the write data is written into NVRAM 218, and an acknowledgment is sent back to the initiator (e.g., the host or application making the request). In one embodiment, storage array 102 supports variable block sizes. Data blocks in the NVRAM 218 are grouped together to form a segment that includes a plurality of data blocks, which may be of different sizes. The segment is compressed and then written to HDD 226. More details are provided below regarding the transfer of data from the NVRAM 218 to HDD 226 with reference to FIG. 4. In addition, if the segment is considered to be cache-worthy (i.e., important enough to be cached or likely to be accessed again) the segment is also written to the SSD cache 228. In one embodiment, the segment is written to the SSD 228 in parallel while writing the segment to HDD 226.

In one embodiment, the performance of the write path is driven by the flushing of NVRAM 218 to disk 226. With regards to the read path, the initiator 244 sends a read request to storage array 102. The requested data may be found in any of the different levels of storage mediums of the storage array 102. First, a check is made to see if the data is found in RAM (not shown), which is a shadow memory of NVRAM 218, and if the data is found in RAM then the data is read from RAM and sent back to the initiator 244. In one embodiment, the shadow RAM memory (e.g., DRAM) keeps a copy of the data in the NVRAM and the read operations are served from the shadow RAM memory. When data is written to the NVRAM, the data is also written to the shadow RAM so the read operations can be served from the shadow RAM leaving the NVRAM free for processing write operations.

If the data is not found in the shadow RAM then a check is made to determine if the data is in cache, and if so (i.e., cache hit), the data is read from the flash cache 228 and sent to the initiator 244. If the data is not found in the NVRAM 218 nor in the flash cache 228, then the data is read from the hard drives 226 and sent to the initiator 244. In addition, if the data being served from hard disk 226 is cache worthy, then the data is also cached in the SSD cache 228.

Figure 4:
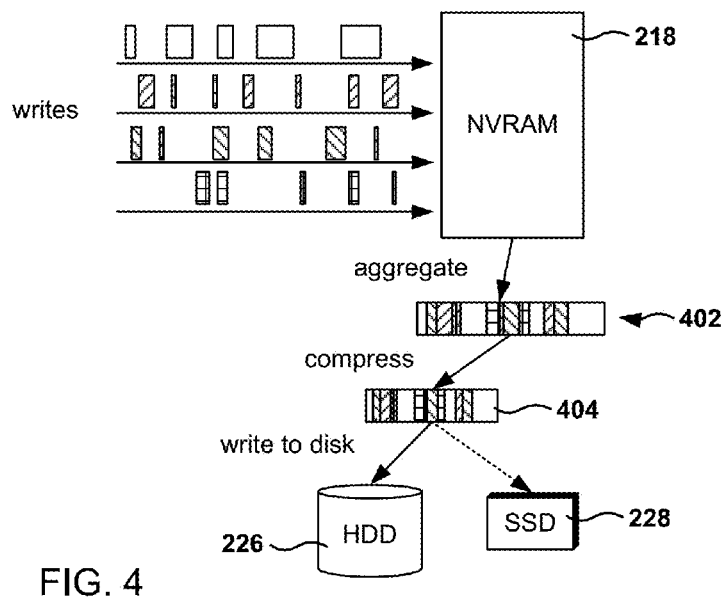
FIG. 4 illustrates the segmentation and compression of write data blocks before saving in hard disk, in accordance with one embodiment of the present disclosure.

FIG. 4 illustrates the segmentation and compression of write data blocks before saving/writing to hard disk, in accordance with one embodiment. The different blocks arrive from one or more hosts to the storage array and then the blocks are stored in NVRAM 218. The incoming blocks are then aggregated into a segment 402, by concatenating the receiving blocks as they arrive to the NVRAM. It is noted that the blocks may have different sizes in one embodiment. The segment 402 is compressed 404 before transmittal to the disk, which results in time savings for the transmittal and savings in the space utilized in the hard drives 226. As noted above, if the data is cache-worthy then the data is also written to flash cache 228. This architecture is very efficient for random writes, as the data is not sorted before being sent to the hard drives, as it is often done in other storage architectures. Here, the data is fluently captured, segmented, compressed, and then sent to the drives, which results in a fast write path for the incoming data.

Figure 5:
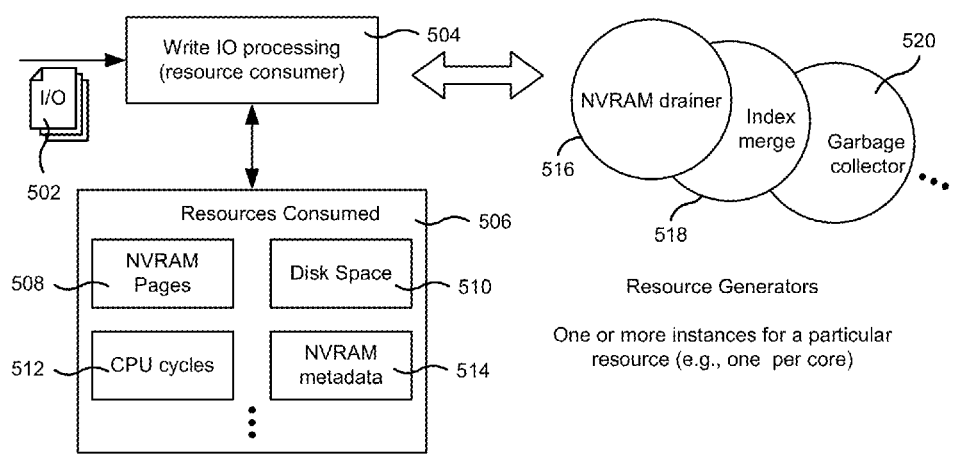
FIG. 5 illustrates the use of resources in the data storage network, in accordance with one embodiment of the present disclosure.

FIG. 5 illustrates the use of resources in the data storage network, in accordance with one embodiment of the present disclosure. Write IOs 502 come into the storage device, and the write IOs 502 consume resources 506 to be processed. The resources consumed include one or more of NVRAM pages 508, disk space 510, CPU cycles 512, NVRAM metadata 514, etc.

It can be said that the write IOs 502 are resource consumers, because the write IOs consume resources to be processed. On the other hand, there are processes in the data storage system, also referred to herein as resource generators or generating tasks, that when executed free the resources consumed by the write IOs 502. For example, the resource generators include NVRAM drainer 516 (also referred to as NVRAM flush), disk space manager 518 (e.g., performing index merging), garbage collector 520, scheduler (not shown) performing hierarchical fair CPU scheduling or hierarchical fair disk access scheduling, etc. It is noted that there could be one or more instances of a resource generator processes executing simultaneously in the storage device. For example, in a storage device with multiple CPU cores, there could be at any given time, a different resource generator process executing in each CPU core. Further, in some disk systems, there is a hierarchical fair disk scheduler for a group of disks, such as a redundant array of independent disks (RAID) grouping. In each disk system, there can be several RAID groups (e.g., one per shelf of disks). As such, different resource generators may be consuming disk IOs in each RAID group.

Figure 6A:
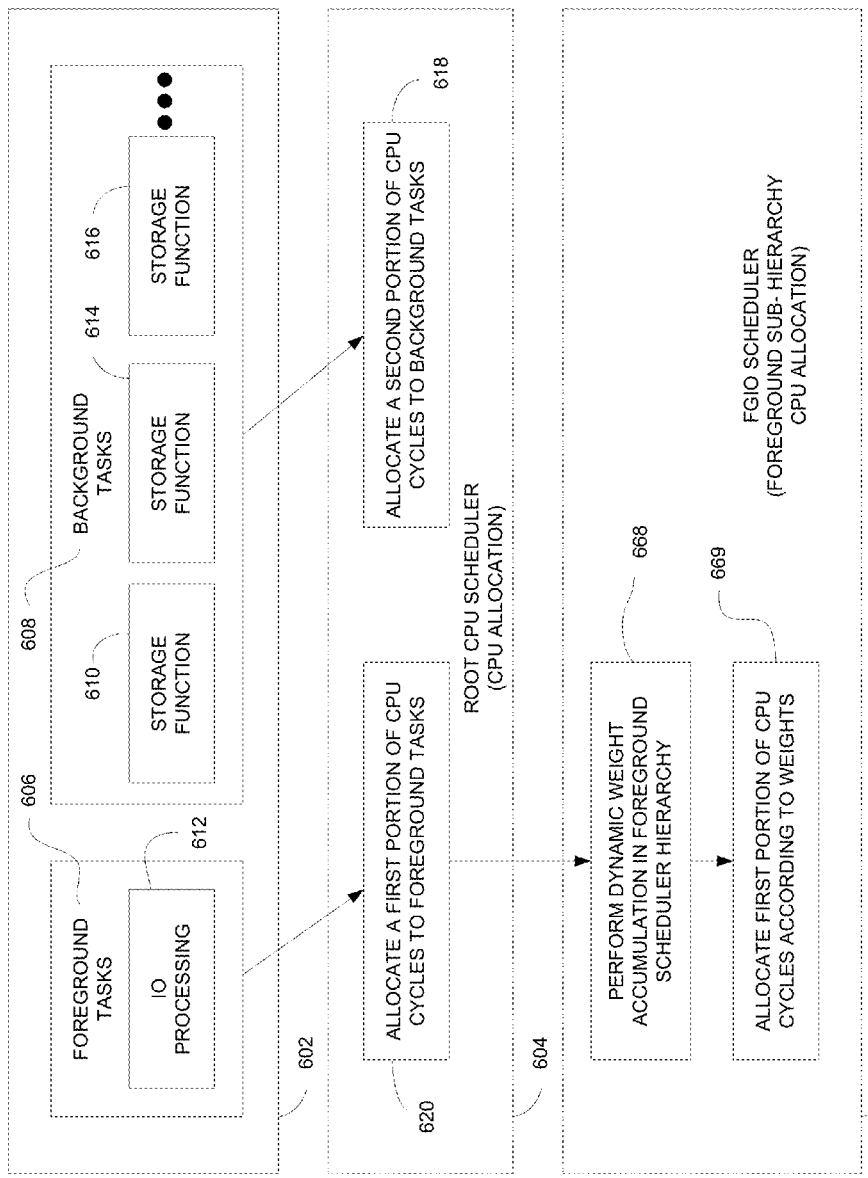
FIG. 6A illustrates dynamic weight accumulation and resource distribution as implemented in a high level diagram of a scheduler hierarchy in a data storage system, in accordance with one embodiment of the present disclosure.

FIG. 6A illustrates dynamic weight accumulation and resource distribution as implemented in a high level diagram of a scheduler hierarchy in a data storage system, in accordance with one embodiment of the present disclosure. As shown, a plurality of tasks 602 performed in a data storage system includes foreground tasks 606 and background tasks 608. Foreground tasks 606 refer to the processing of IO requests 612 by one or more processors, as previously described. For example, the storage array may have a CPU with multiple core processors (e.g., 2, 4, 8, 12, 16, 20, 24, 44 cores, etc.). In one embodiment, threads are created within each CPU core for processing requests, and may be referred to as worker threads. In one implementation, one thread may be created per CPU core. In other implementations, multiple threads per CPU core may be supported. Threads are constantly running as long as requests need to be processed.

Background tasks 608 (e.g., storage function 610, storage function 614, and storage function 616, etc.) are tasks created in the storage system for general operations in the array. The background tasks may arise in response to certain events, such as consumption of a resource reaching a threshold, periodicity to ensure metadata consistency, a schedule to take a snapshot becoming ready, etc. For example, background tasks may include garbage collection of obsolete data, compaction of data (e.g., merging contents of two half-filled segments into one full segment), creating snapshots of data, backup, and replication procedures, etc.

In one embodiment, a root fair CPU scheduler 604 is configured to fairly allocate CPU cycles to foreground workloads 606 and background tasks 608. In particular, to ensure fairness between background tasks and foreground workloads, root fair CPU scheduler 604 identifies tasks waiting to be executed and allocates resources to these tasks fairly. For example, root fair CPU scheduler 604 performs operations to allocate a first portion of CPU cycles to foreground tasks at block 620, and performs operations to allocate a second portion of CPU cycles to background tasks at block 618. In that manner, static distribution of resources is achieved between foreground tasks and background tasks. As such, fairness in resource allocation means that any single background task or foreground IO processing cannot dominate CPU utilization. Additionally, any single foreground workload cannot dominate with regards to receiving input/output per second (IOPS) or MBPS from the data storage system. In one embodiment, fairness enables proper assignment of resources in terms of allocating CPU cycles. In another embodiment, fairness enables proper assignment of resources in terms of data consumption, where the data consumption may be measured as megabytes accessed or megabytes per second (MBPS) as delivered by the different workloads. Allocation of CPU resources by the root scheduler between foreground and background tasks is more fully described in the references previously incorporated by reference (i.e., U.S. patent application Ser. No. 14/748,179, and U.S. Provisional Patent Application Ser. No. 62/058,015, both entitled "Quality of Service Implementation in a Networked Storage System with Hierarchical Schedulers,").

In addition, a foreground input/output (FGIO) scheduler 660 is configured to fairly allocate the first portion of CPU cycles that are assigned to foreground workloads (e.g., tasks) throughout a scheduler sub-hierarchy of a data storage system, wherein the sub-hierarchy includes the FGIO scheduler and its descendent schedulers. In particular, the FGIO scheduler is configured to perform in block 668 dynamic weight accumulation in a bottom-up fashion in the scheduler sub-hierarchy, such that weights of schedulers are propagated upwards through the scheduler hierarchy. As previously described, weights of leaf schedulers in a scheduler hierarchy are propagated upwards only till the children of the FGIO scheduler, and not to the FGIO scheduler. As such, in block 669 the FGIO scheduler is configured to allocate the first portion of CPU cycles (previously allocated by the root CPU scheduler 604) according to the weights as determined through dynamic weight accumulation.

Figure 6B:
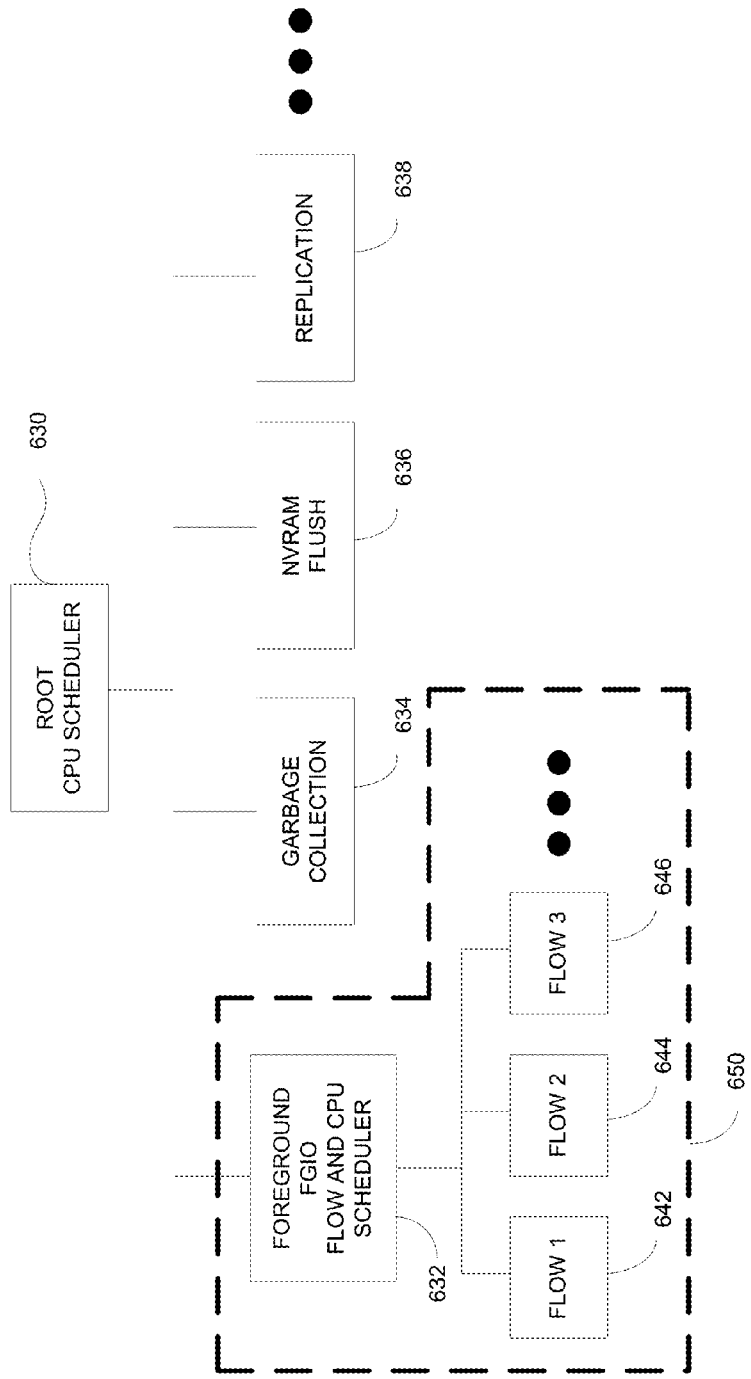
FIG. 6B illustrates a detailed diagram of a scheduler hierarchy in a data storage system configured to perform dynamic weight accumulation for purposes of fair CPU scheduling, in accordance with one embodiment of the present disclosure.

FIG. 6B illustrates a detailed diagram of a universal scheduler hierarchy 600B in a data storage system configured to perform dynamic weight accumulation for purposes of fair CPU scheduling, in accordance with one embodiment of the present disclosure. The universal scheduler hierarchy 600B includes a root CPU scheduler 630, and a foreground (FGIO) flow scheduler 632. Schedulers in the hierarchy 600B know about the relative importance of tasks to be performed, including configured user parameters regarding priority/importance for allocation. A CPU scheduling system including the hierarchy of schedulers 600B, wherein schedulers in the system operate cooperatively at different levels. For example, the CPU scheduling system determines the order in which tasks are processed (i.e., assigned CPU time) and how much CPU resources (e.g., CPU cycles) are allocated to the tasks.

In one embodiment, each scheduler in the hierarchy 600B operates on one or more schedulable entities, wherein entities are any IO request (e.g., for performing IOs) or any work request (e.g., for performing background tasks). Maintaining multiple levels of schedulers enables achieving fairness in multiple dimensions, such as foreground task versus background tasks, controlling access to hard disk by different applications, etc. The objective of the universal scheduler hierarchy 600B is to select the most eligible IO or work request that is waiting for a resource (e.g., a queued task) and allocate the resource to the request.

In one example, there are two kinds of schedulers in the hierarchy 600B: schedulers that select another scheduler, and schedulers that select a request to be allocated with CPU time. Fairness may be configured at every level and by all schedulers or at select levels or schedulers. The overall goals of the scheduling system are to obtain fairness among the different tasks in the storage array, and to provide controls to the user for assigning priorities to different tasks, and to flows of foreground flow processing.

At the root is the CPU scheduler, also referred to herein as the root scheduler 630. In some embodiments, there may be another scheduler above the root scheduler 630, which may then be designated as the root, etc. However, in this example, the mission of the root scheduler 630 is to select a task for allocating CPU resources throughout the universal hierarchy 600B. In one embodiment, each task has its own scheduler. Therefore, CPU scheduler 330 is a scheduler that selects another scheduler.

For example, root scheduler 630 is configured to ensure fairness of resource allocation between foreground and background tasks. That is, root scheduler 630 is configured to allocate CPU resources between the foreground and background tasks, as previously described in FIG. 6A. For example, a first portion of CPU resources is assigned to foreground tasks, and a second portion of CPU cycles is assigned to background tasks, including garbage collection 634, NVRAM flush 636, replication 638, etc., as is shown in blocks 620 and 618 of FIG. 6A. That is, static distribution of resources is achieved between foreground tasks and background tasks. For example, it would be unsatisfactory to have a background task using so much CPU that the foreground workloads would not obtain enough CPU to provide adequate performance. Similarly, it would be unsatisfactory to have too many user requests to starve the background tasks from CPU time.

In embodiments, there are other schedulers below the root scheduler 630. In addition, there may be a sub-hierarchy of schedulers 650 that is configured for handling foreground tasks. Embodiments of the present invention provide for fair allocation of resources that have been previously allocated by the root scheduler 630 for purposes of handling foreground tasks or workloads, wherein the fair allocation is based on dynamic weight accumulation performed in a bottom-up fashion in the scheduler sub-hierarchy 650, such that weights of schedulers are propagated upwards through the scheduler sub-hierarchy 650. In particular, weights of leaf schedulers in a scheduler hierarchy are propagated upwards only till the children of the FGIO scheduler, and not to the FGIO scheduler.

Regarding foreground flows or workloads, fairness of resource allocation may include ensuring that one volume does not consume a disproportionate amount of resources so that other volumes are starved for CPU resources. For example, if one flow increases its load temporarily, the increase should not have a major impact on the performance of other flows. The foreground flow FGIO scheduler 632 selects which flow is to be served next, i.e., which flow scheduler will be invoked next. For example, foreground flow FGIO scheduler 632 serves flow 1 of block 642, flow 2 of block 644, flow 3 of block 646, etc. in order. A flow may represent a set of foreground IOs belonging to a virtual logical unit number (LUN), wherein the LUN is a unique identifier given to devices for purposes of access using various communication protocols. As such, the foreground IOs for LUN may be represented internally by the fair foreground FGIO scheduler 632 as a flow.

Figure 6C:
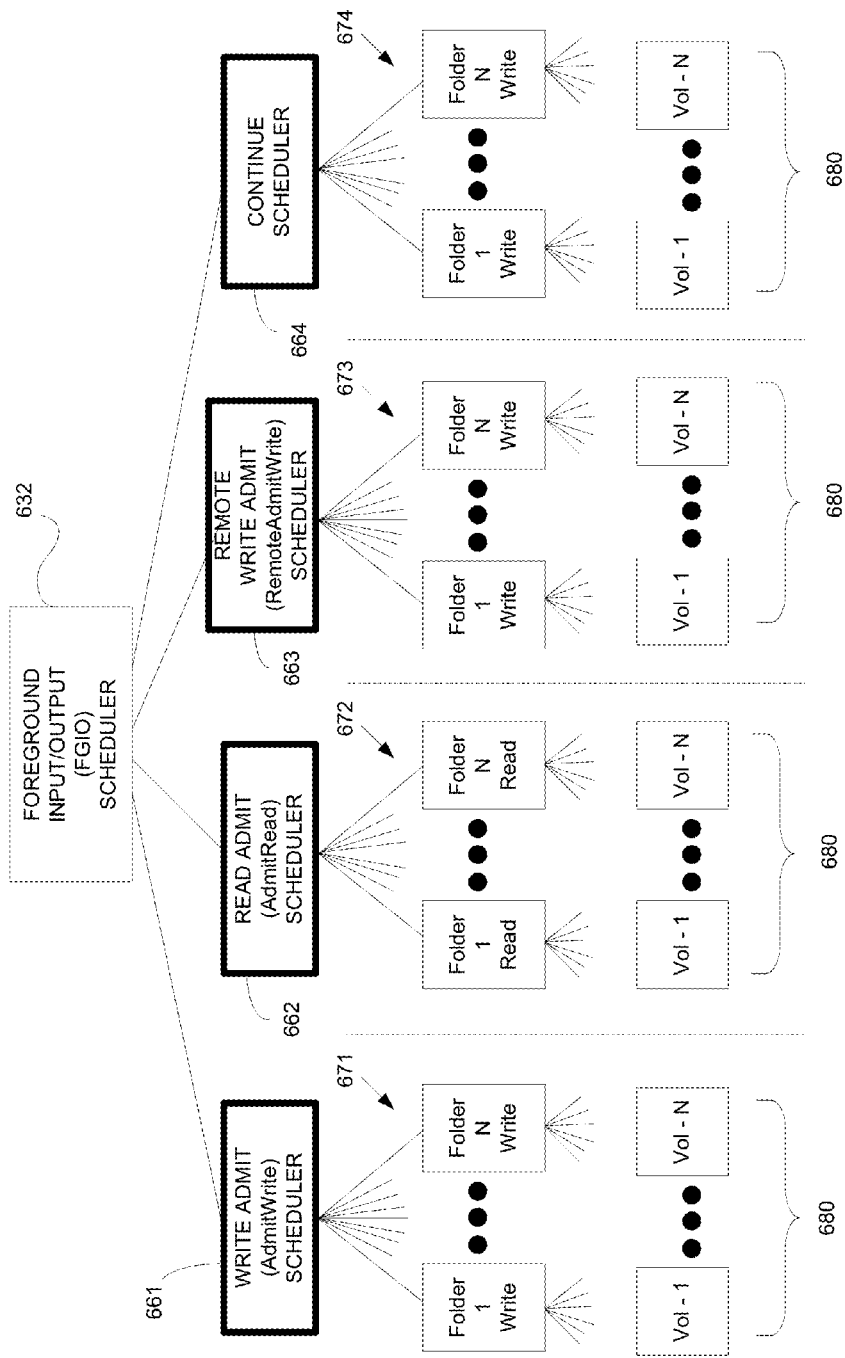
FIG. 6C illustrates an exemplary scheduler sub-hierarchy including at the top level a foreground input output (FGIO) scheduler that is configured to implement fair utilization of resources in a scheduler hierarchy of a data storage system based on dynamic weight accumulation performed in a bottom-up fashion, in accordance with one embodiment of the present disclosure.

In addition, foreground flow FGIO scheduler 632 is configured for receiving an allocated amount of CPU resources (e.g., X amount) from the root scheduler for use in handling foreground tasks, and for fairly allocating those X resources throughout the scheduler sub-hierarchy 650 using dynamic weight accumulation of embodiments of the present invention. In particular, FIG. 6C illustrates an exemplary scheduler sub-hierarchy including at the top level (or root of the sub-hierarchy) the foreground input output (FGIO) scheduler 632 (previously introduced in FIG. 6B) that is configured to implement fair utilization of CPU resources in the scheduler sub-hierarchy of a data storage system based on dynamic weight accumulation performed in a bottom-up fashion, in accordance with one embodiment of the present disclosure. In particular, weights of leaf schedulers in a scheduler hierarchy are propagated upwards to the children of the FGIO scheduler, and not to the FGIO scheduler, for purposes of distributing the resources allocated to foreground tasks, as assigned to and scheduled by the FGIO scheduler. That is, weights of leaf schedulers in the scheduler hierarchy are propagated upwards for purposes of distributing the resources allocated to foreground tasks fairly between all the volumes. Weights are not propagated to the FGIO scheduler and above in order to preserve the static allocation between FGIO and background tasks. In that manner, the weight propagation of the present embodiments does not affect background tasks.

As shown in FIG. 6C, foreground IOs belonging to a virtual LUN is represented internally by the FGIO scheduler as a flow. For each flow, FGIO scheduler creates four schedulers, including write admit scheduler 661 (referred to as AdmitWrite scheduler), admit read scheduler 662 (also referred to as AdmitRead scheduler), remote write admit scheduler 662, and continue scheduler 664, each of which is configured for allocating CPU resources. In particular, the AdmitWrite scheduler 661 is configured to achieve admission control (e.g., through queuing) of local write, write same, unmap, and ATS IOs that are not yet admitted into the data storage system. The AdmitRead scheduler 662 is configured to read IOs (e.g., through queueing) that are not yet admitted into the system. That is, the AdmitRead scheduler 662 is configured to achieve admission control for read IOs in the system. Remote AdmitWrite scheduler 663 is configured to achieve admission control (e.g., queue) over remote write, write same, unmap, and ATS IOs that are not yet admitted into the data storage system. Continue scheduler 664 is configured to queue previously admitted IOs.

The scheduler sub-hierarchy 600C is shown after adding folder schedulers, wherein each folder supports one or more volumes. Schedulers are added to folders to set and define certain parameters, in one implementation. For example, the folder scheduler is able to set limits for the folder, such as megabytes per second (MBPS), IOs per second (IOPS), etc. Folder schedulers have pointers to volume flow schedulers below, and are configured to perform fair CPU scheduling between volumes through dynamic weight accumulation, as will be further described below. A parent/child relationship in the sub-hierarchy 600C exists between the admit schedulers and the folders underneath the admit schedulers. Each volume and folder (e.g., volumes 680) in the scheduler hierarchy, such as hierarchy 600C, has four schedulers, as follows: 1) admit read folder scheduler is a child of AdmitRead scheduler 662; 2) admit write folder scheduler is a child of AdmitWrite scheduler 661; 3) admit remote write folder scheduler is a child of RemoteAdmitWrite scheduler 663; and continue folder scheduler is a child of Continue scheduler 664. For example, the parent AdmitWrite CPU scheduler has a plurality of children folders 1-N 671, parent AdmitRead CPU scheduler 662 has a plurality of children folders 1-N 672, parent Remote AdmitWrite CPU scheduler 663 has a plurality of children folders 1-N 673, and parent Continue scheduler 664 has a plurality of children folders 1-N 674. The state (e.g., active or inactive) of each of the four schedulers for a particular volume depends on what kind of operations are active for that volume. For example, for a particular volume, only the admit read folder scheduler may be active because there are only reads happening in that volume. In that case, the other three folder schedulers associated with that volume are inactive. In that case, volume weights are propagated upwards only to the AdmitRead CPU scheduler 662.

The configuration of folders and volumes (e.g., parent/child relationships) should be similar or mirrored between at least the AdmitWrite scheduler 661 and the AdmitRead scheduler 662 in an initial state. That is because there is a set amount of volumes (e.g., 1-N) in the LUN being served by the FGIO scheduler 632. Further, in another implementation, the configuration of the Remote AdmitWrite scheduler 663 and Continue scheduler 664 are also similar. For example, the sub-hierarchy of schedulers under the AdmitWrite scheduler 661 includes a first level including a plurality of write folders 1-N 671, and a second level under the first level including plurality of volumes 1-N 680. In this case, the folders are the parents, with volumes as children. Also, the sub-hierarchy of schedulers under the AdmitRead scheduler 662 includes a first level including a plurality of read folders 1-N 672, and a second level under the first level including the plurality of volumes 1-N 680. Further, the sub-hierarchy of schedulers under the Remote AdmitWrite scheduler 663 includes a plurality of remote write folders 1-N 673 at a first level, and a second level under the first level including the plurality of volumes 1-N 680. Also, the sub-hierarchy of schedulers under the Continue scheduler 664 includes a plurality of continue folders 1-N 674 at a first level, and a second level under the first level including a plurality of volumes 1-N 680. In one embodiment, no folders exist between the Continue scheduler 664 and the plurality of volumes 1-N 680, and weights are propagated upwards directly to the Continue scheduler 664. The number of folders (e.g., 1-N) under each Admit scheduler and the Continue scheduler 664 at the first level is the same in one embodiment.

Since there are folders in the scheduler hierarchy 600B, CPU cycles must be distributed fairly between folders. If CPU cycles are allocated equally between all folders, this could cause various unfairness issues, including unfairness between volumes, and unfairness between AdmitRead, AdmitWrite, and Continue schedulers. For example, unfairness between volumes may occur when a first folder only has one volume, while a second folder has multiple volumes. When resources are distributed equally between folders, the volume in the first folder would receive a higher share of resources than a volume in the second folder. In the other case, unfairness between schedulers may occur if AdmitRead, AdmitWrite, and Continue schedulers have unequal active flow schedulers (e.g., unequal numbers of active volumes). In that case, the scheduler having the lowest active flow schedulers would get a higher share than the other two schedulers. On the other hand, embodiments of the present invention introduce dynamic weight accumulation in the scheduler hierarchy to fairly allocate resources, especially between folders, as will be further described below in FIGS. 7-9.

Figure 7:
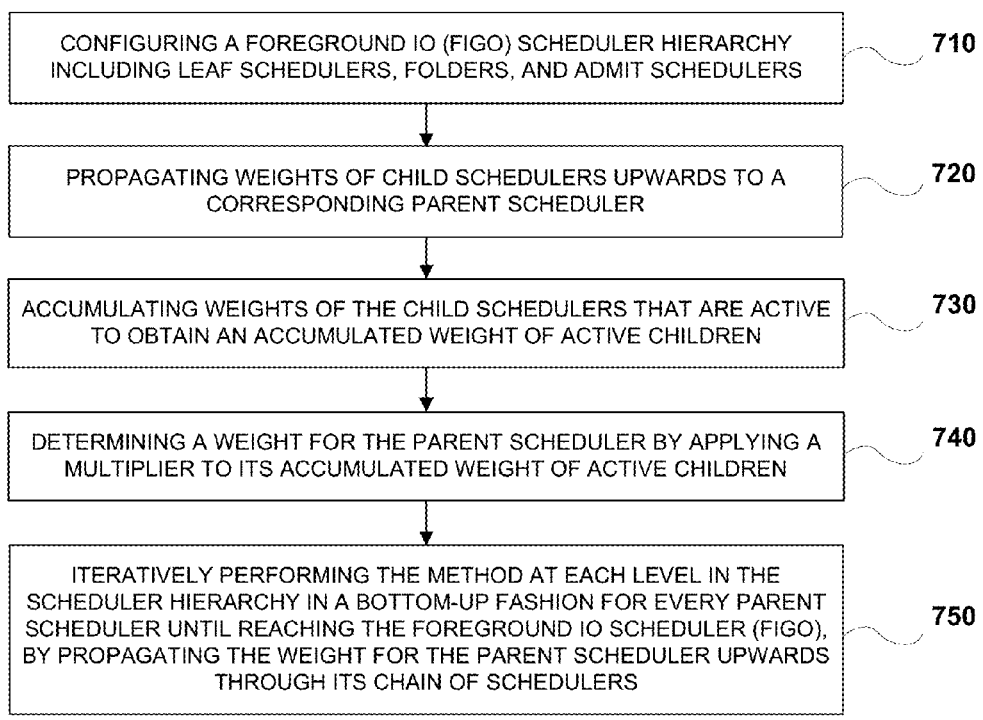
FIG. 7 is a flow diagram of illustrating a method for fair utilization of resources in a scheduler hierarchy of a data storage system based on dynamic weight accumulation performed in a bottom-up fashion, in accordance with one embodiment of the present disclosure.
Figure 8A:
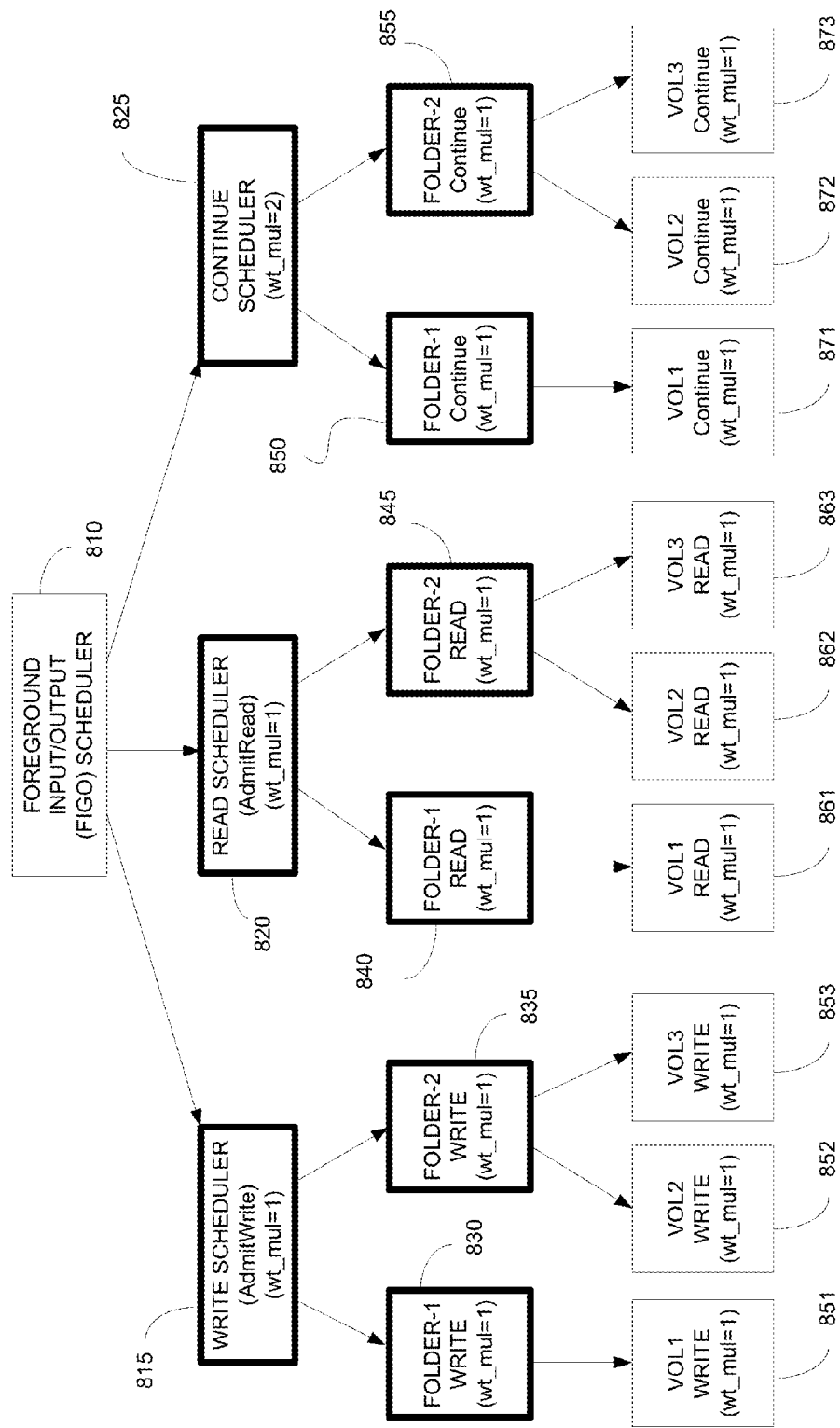
FIG. 8A is an illustration of a scheduler hierarchy in a data storage system, in accordance with one embodiment of the present disclosure.
Figure 8B:
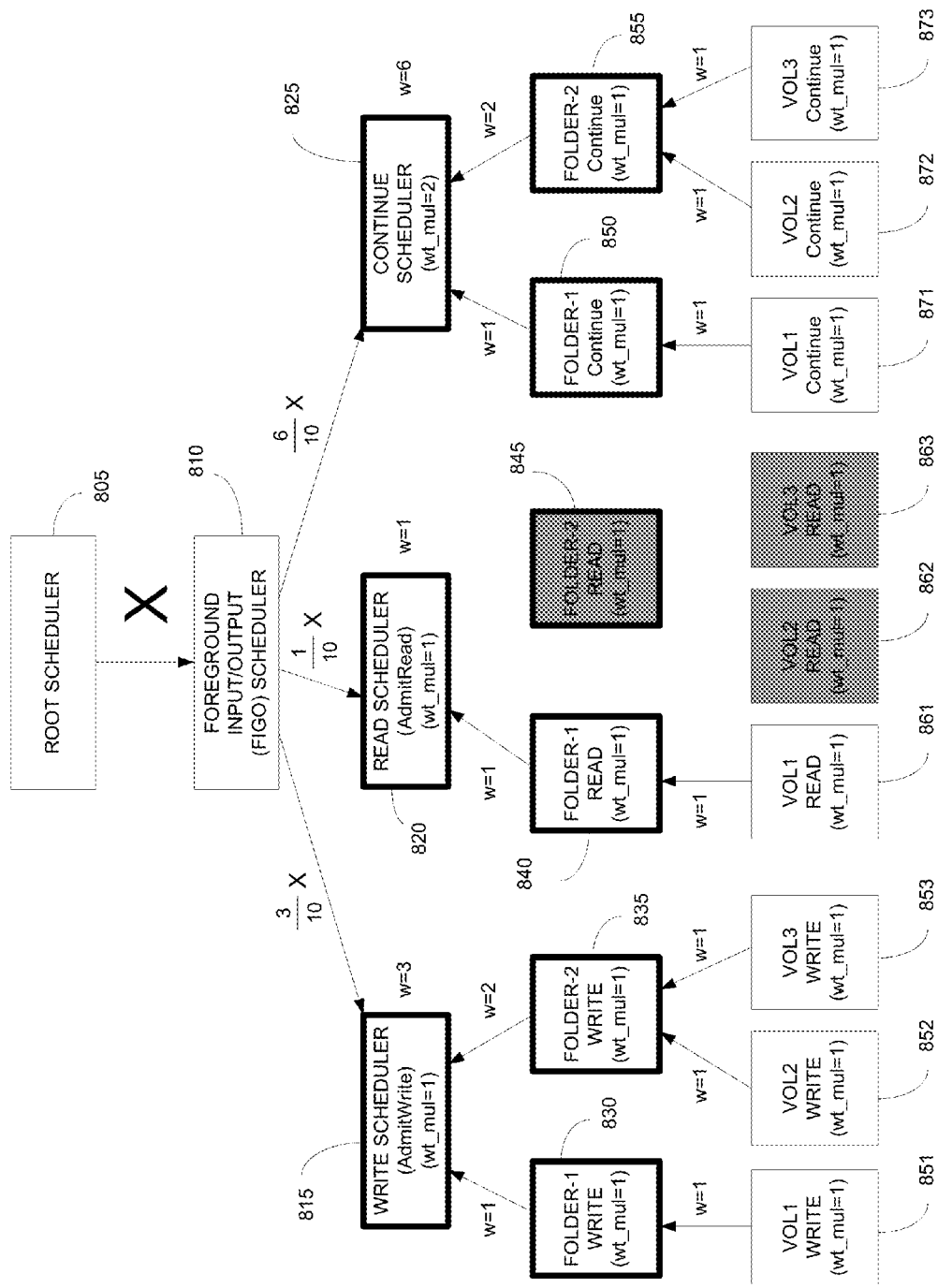
FIG. 8B is an example of dynamic weight accumulation used for purposes of fair utilization of resources that is performed on the scheduler hierarchy of FIG. 8A having active and inactive schedulers, in accordance with one embodiment of the present disclosure.
Figure 8C:
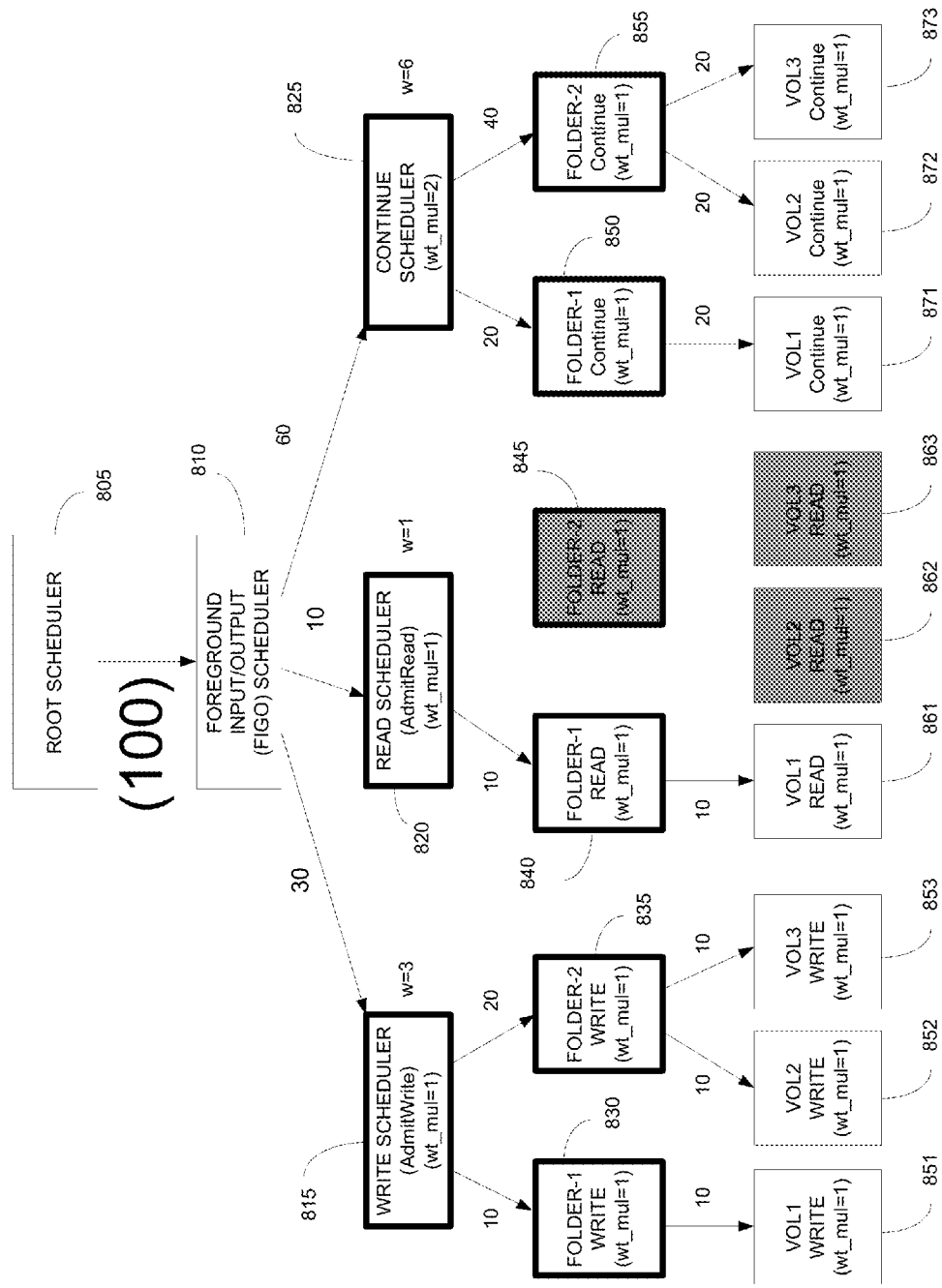
FIG. 8C illustrates an exemplary application of dynamic weight accumulation of through a scheduler hierarchy first introduced in FIG. 8A given an allotted amount of resources of 100 units, in accordance with one embodiment of the present disclosure.
Figure 8D:
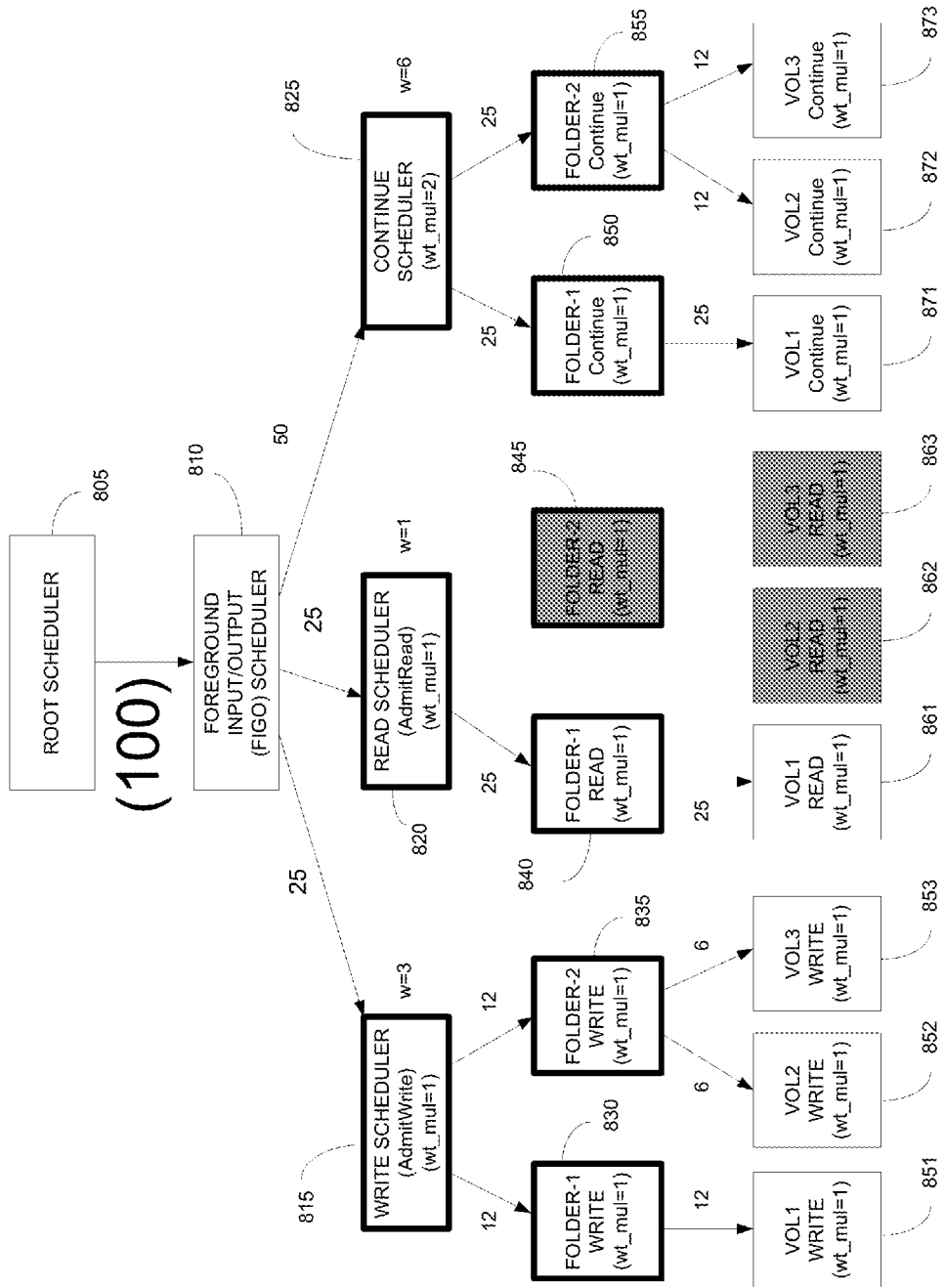
FIG. 8D illustrates the unfair distribution of resources when DWAC is not implemented during the application of weights through the scheduler hierarchy first introduced in FIG. 8A, given an allotted amount of resources of 100 units, in accordance with one embodiment of the present disclosure.
Figure 9A:
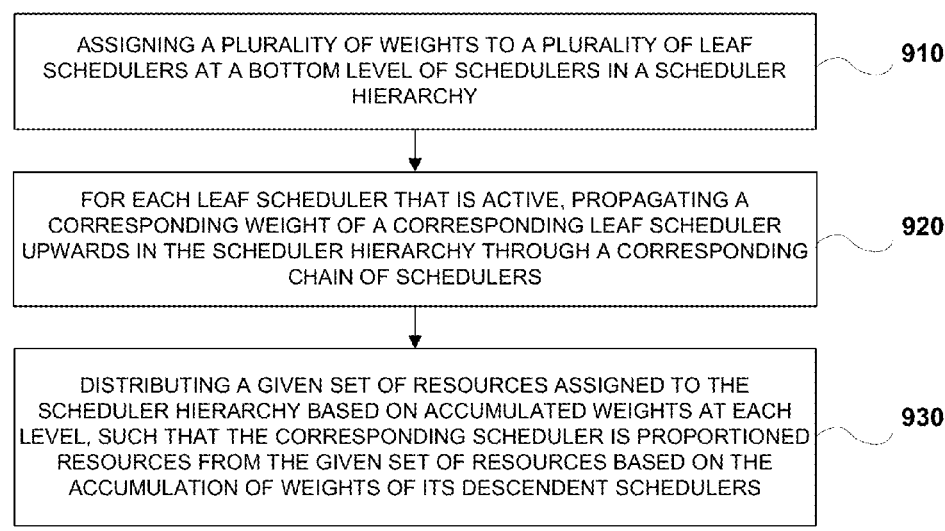
FIG. 9A is a flow diagram illustrating a method for allocating resources based on dynamic weight accumulation performed in a bottom-up fashion in a scheduler hierarchy of a data storage system, such that weights of schedulers are propagated upwards through the scheduler hierarchy, in accordance with one embodiment of the present disclosure.

FIGS. 7, 8A-8D, and 9A-9B in combination illustrate the implementation of fair allocation of CPU resources using dynamic weight accumulation. For example, FIGS. 7 and 9A are flow diagrams illustrating methods for fair utilization of CPU resources, FIG. 8A is an exemplary scheduler hierarchy, and FIGS. 8B-8D and 9B illustrate the scheduler hierarchy with active and inactive schedulers when performing dynamic weight accumulation.

In particular, FIG. 7 is a flow diagram 700 illustrating a method for fair utilization of resources in a scheduler sub-hierarchy, including a root foreground IO (FGIO) scheduler, of a data storage system based on dynamic weight accumulation performed in a bottom-up fashion, in accordance with one embodiment of the present disclosure. In one embodiment, flow diagram 700 is implemented within controller 104 of FIG. 1, and more particularly the hierarchical fair CPU scheduler 124 or hierarchical fair disk access scheduler 126 of FIG. 1, or active controller 206 of FIG. 2, FGIO schedulers 660 and 632 of FIGS. 6A-6C.

Embodiments of the present invention introduce dynamic weight accumulation (DWAC) in the scheduler hierarchy or sub-hierarchy (e.g., sub-hierarchy 600B) to fairly allocate resources, especially between folders, and more particularly at schedulers below the FGIO scheduler. In the scheduler hierarchy, DWAC determines a weight of a scheduler by using its own weight multiplier and weights of its active children (descendants). DWAC is used to achieve fair allocation of CPU resources between volumes.

At operation 710, the method includes configuring a FGIO scheduler hierarchy including leaf schedulers, folders, and admit schedulers, in accordance with one embodiment of the present disclosure. The leaf schedulers form the bottom of the scheduler hierarchy, and include a plurality of volumes. For example, an exemplary scheduler sub-hierarchy is shown in FIG. 8A, and includes at a root level FGIO scheduler 810, a second level of admit schedulers (e.g., AdmitWrite scheduler 815, AdmitRead scheduler 820, and Continue scheduler 825), a third level of folders, and a fourth level (e.g., the bottom leaf level) of volumes. Only schedulers that are bolded will calculate dynamic weights. In this example, the RemoteWrite Admit Scheduler is not active and is not shown in the sub-hierarchy.

Two folders are configured under the AdmitWrite scheduler 815. For example, write folder-1 830 is configured under the AdmitWrite scheduler 815, and has one child volume (write VOL1 851). Also, write folder-2 835 is configured under the AdmitWrite scheduler 815, and has two child volumes (e.g., write VOL2 852 and write VOL3 853) in the hierarchy.

The configuration of folders and volumes associated with the AdmitRead scheduler 820 is similar to the folders and volumes associated with the AdmitWrite scheduler 815 at least in their initial configuration. In particular, two folders are configured under the AdmitRead scheduler 820. For example, read folder-1 840 is configured under the AdmitRead scheduler 820, and has one child volume (read VOL1 861). Also, read folder-2 845 is configured under AdmitRead scheduler 820, and has two child volumes (e.g., read VOL2 862 and read VOL3 863). Also, two folders are configured under the Continue scheduler 825. In particular, continue folder-1 850 is configured under Continue scheduler 825, and has on child volume (continue VOL1 871. Further, continue folder-2 855 is configured under Continue scheduler 825, and has two child volumes (e.g., continue VOL2 872 and continue VOL3 873). In one embodiment, write, read and continue volumes for VOL1 are representative of the same volume (e.g., VOL1) used for access. Similarly, the write, read and continue volumes for VOL2 are representative of the same volume (VOL2); and the write, read and continue volumes for VOL3 are representative of the same volume (VOL3).

In one embodiment, no folders are configured under the continue scheduler 825. In that case, all three continue volumes (e.g., continue VOL1 871, continue VOL2 872, and continue VOL3 873) are configured directly under the continue scheduler 825. As such, in a parent/child relationship, the continue scheduler 825 is the parent, with continue volumes 871, 872, and 873 as children.

Operation 720 in the method includes propagating weights of active child schedulers upwards to a corresponding parent scheduler. That is, between two levels in the scheduler sub-hierarchy, and between a parent scheduler and its children schedulers, the final weights are propagated upwards between each of the active children to the parent. For example, under AdmitWrite scheduler 815, the weights of write VOL2 852 and write VOL3 853 are propagated upwards to write folder-2 835, if the two volumes are active.

Operation 730 in the method includes accumulating weights of the child schedulers that are active to obtain an accumulated weight of active children. For example, the weights of write VOL2 852 and write VOL3 853 are summed to obtain the accumulated weight of the children volumes.

Operation 740 in the method includes determining a weight for the parent scheduler by applying a multiplier to its accumulated weight of active children. In the example shown in FIG. 8A, all of the schedulers (e.g., AdmitWrite, AdmitRead, the various folders-1 and folders-2, and the various volumes-1, volumes-2, and volumes-3) have an exemplary multiplier of 1, except for the continue scheduler 825, which has a multiplier of 2. Continuing with the example, a multiplier (in this case a value 1) is applied to the accumulated weight of active children (e.g., write VOL2 852 and write VOL3 853). The multiplier is based on the relative share of the folder/volume/scheduler with respect to other folders/volumes/schedulers at the same level. In embodiments, the weight multiplier can be assigned by the system or the user based on the relative priority of the volume/folder.

Operation 750 in the method includes recursively performing the method at each level in the scheduler hierarchy for every parent scheduler until reaching the foreground IO scheduler (FGIO), by propagating the weight for the parent scheduler upwards through its chain of schedulers. In particular, the method is performed from the bottom-up through the scheduler sub-hierarchy. When DWAC is enabled or initiated on a parent scheduler, between two levels in the scheduler sub-hierarchy having a parent/children association, every child scheduler under such a parent calculates dynamic weight using its weight multiplier and weights of its own active child schedulers in a bottom up fashion. In the recursive process, to avoid inconsistencies, it is mandatory that all descendants (e.g., child schedulers and grandchild schedulers, etc.) under such a DWAC parent are subjected to dynamic weight accumulation. In one embodiment, weights of leaf schedulers in a scheduler hierarchy are propagated upwards only till the children of the FGIO scheduler, and not to the FGIO scheduler. In that manner, static distribution of resources is maintained between foreground tasks (scheduled by FGIO scheduler) and background tasks.

FIG. 8B illustrates an exemplary application of dynamic weight accumulation of operation 750 through a scheduler hierarchy first introduced in FIG. 8A, in accordance with one embodiment of the present disclosure. In the example of FIG. 8B, at each level weights are propagated upwards to a parent scheduler from its children, accumulated, and factored with a corresponding multiplier. This process is accomplished at each level in a bottom up fashion, beginning from a bottom level. As previously described, weights of leaf schedulers in a scheduler hierarchy are propagated upwards only till the children of the FGIO scheduler, and not to the FGIO scheduler. In particular, going from left to right in FIG. 8B, beginning with write folder-1 830 (a parent scheduler), the final weight of its children (write VOL1 851) are propagated upwards. That is, the volume scheduler (VOL1 851) has a weight of 1, and multiplier of 1, such that the final weight of VOL1 851 equals 1, after factoring in its multiplier, and this final child weight is propagated upwards to write folder-1 830. To determine the weight of write folder-1 830, its children weights are accumulated, and factored with its multiplier (value of 1). Since there is only one child (VOL1 851), the final weight of write folder-1 equals 1, after factoring its multiplier.

Now taking write folder-2 835 (parent scheduler), the weight of its children (write VOL2 852 and write VOL3 853) are propagated upwards. That is, VOL2 852 has a weight of 1, such that final weight of VOL2 852 equals 1, after factoring in the multiplier of 1, which is then propagated upwards to write folder-2 835. Similarly, the final weight of VOL3 853 equals 1, which is then propagated upwards to write folder-2 835. At this point, to determine the weight of write folder-2 835, its children weights are accumulated, and factored with its multiplier (value of 1). There are two children (VOL2 852 and VOL3 853), each having a weight of 1, and the accumulated weight of the children equals 2, which is the final weight of write folder-2.

Weights for all folders under AdmitRead scheduler 820 are also similarly determined by performing dynamic weight accumulation. In particular, for read folder-1 840, the final weights of its children are propagated upwards, accumulated, and factored by its multiplier to determine a final weight for read folder-1 840 equaling 1. As shown in FIG. 8B, read folder-2 is inactive (shown by graying the corresponding block) because its children (read VOL2 862 and read VOL3 863) are both inactive. That is, inactive elements are suspended from the scheduler hierarchy until they become active. For example, no pointers are shown in FIG. 8B between VOL2 862 and read folder-2 845, VOL3 863 and read folder-2 845, or read folder-2 845 and read scheduler 820. As such, weights for read folder-2 and its children are not determined due to inactivity, and no weight for read folder-2 is propagated upwards.

Also, weights for folders under Continue scheduler 825 are also similarly determined by performing dynamic weight accumulation. In particular, beginning with continue folder-1 850 (a parent scheduler), the final weight of its children (continue VOL1 871) is propagated upwards. That is, the volume scheduler (VOL1 871) has a weight of 1, and multiplier of 1, such that the final weight of VOL1 871 equals 1, after factoring in its multiplier, and this final child weight is propagated upwards to continue folder-1 850. To determine the weight of continue folder-1 850, its children weights are accumulated, and factored with its multiplier (value of 1). Since there is only one child (VOL1 871), the final weight of continue folder-1 850 equals 1, after factoring its multiplier. Now taking continue folder-2 855 (parent scheduler), the weight of its children (continue VOL2 872 and continue VOL3 873) are propagated upwards. That is, VOL2 872 has a weight of 1, such that final weight of VOL2 872 equals 1, after factoring in the multiplier of 1, which is then propagated upwards to continue folder-2 855. Similarly, the final weight of VOL3 873 equals 1, which is then propagated upwards to continue folder-2 855. At this point, to determine the weight of continue folder-2 855, its children weights are accumulated, and factored with its multiplier (value of 1). There are two children (VOL2 872 and VOL3 873), each having a weight of 1, and the accumulated weight of the children equals 2, which is the final weight of continue folder-2 855.

Further, in the embodiment where there are no folders under the Continue scheduler 825, a parent/child relationship exists between continue volumes (VOL1 871, VOL2 872, and VOL3 873) and the continue scheduler 825. As such, for continue scheduler 825, the final weights of its children (each equaling value of 1) are propagated upwards, accumulated (1+1+1=3), and factored by its multiplier (2) to determine a final weight for continue scheduler 825 which equals 6.

In the recursive process, the next two levels performing dynamic weight accumulation are between the admit schedulers and corresponding folders, as well as the continue scheduler 825 and its corresponding folders. For example, for AdmitWrite scheduler 815, the final weights of its children (write folder-1 830 having weight of 1, and write folder-2 having a weight of 2) are propagated upwards, accumulated (1+2=3), and factored by its multiplier (1) to determine a final weight for AdmitWrite scheduler 815 which equals 3. A similar process is performed for AdmitRead scheduler 820, wherein the final weights of its children (read folder-1 840 having a weight of 1) is propagated upwards, accumulated (1), and factored by its multiplier (1) to determine a final weight of AdmitRead scheduler 820 which equals 1. Also, a similar process is performed for Continue scheduler 825, wherein the final weights of its children (continue folder-1 850 having weight of 1, and continue folder-2 855 having a weight of 2) are propagated upwards, accumulated (1+2=3), and factored by its multiplier (2) to determine a final weight for Continue scheduler 825 which equals 6.

At this point, a given set of resources assigned to the scheduler sub-hierarchy is distributed based on the accumulated weights at each level, such that a corresponding scheduler is proportioned resources from the given set of resources based on the accumulation of weights of its descendent schedulers. In the example of FIG. 8B, the given set of resources given to FGIO scheduler 810 by the root scheduler 805 is represented by "X." The given set of resources (e.g., CPU cycles) is proportioned to AdmitWrite scheduler 815, AdmitRead scheduler 820, and Continue scheduler 825 based on their final weights. Since all of the given set of resources is distributed, AdmitWrite scheduler 815 receives 3/10 X, AdmitRead scheduler 820 receives 1/10 X, and Continue scheduler 825 receives 6/10 X. These resources are similarly proportioned underneath each of the AdmitWrite scheduler 815, AdmitRead scheduler 820, and Continue scheduler 825, and corresponding volumes based on the accumulated weights at each level. In that manner, each volume gets its fair share of resources based on their relative configured weights.

FIG. 8C illustrates an exemplary application of dynamic weight accumulation of through a scheduler hierarchy first introduced in FIG. 8A given an allotted amount of resources of 100 units, in accordance with one embodiment of the present disclosure. In FIG. 8C, FGIO 810 is allotted 100 units. It is expected that all volume schedulers (e.g., volume schedulers 851-853, 861-863) under AdmitWrite scheduler 815 and AdmitRead scheduler 820 get 10 units each, and volume schedulers (e.g., volume schedulers 871-873) under Continue scheduler 825 get 20 units each (i.e., because the Continue weight is 2). FIG. 8C shows the fair distribution of resources using dynamic weight accumulation (DWAC). On the other hand, FIG. 8D illustrates the unfair distribution of resources (e.g., 100 units) when DWAC is not implemented during the application of weights through the scheduler hierarchy, given an allotted amount of resources of 100 units.

In one embodiment, dynamic weight accumulation is enabled on a FGIO scheduler 810, and is triggered periodically based on a predetermined period (e.g., timer callback is triggered periodically, such as 200 ms). On such an event, all child schedulers and grandchild schedulers calculate their weights recursively, as shown in FIG. 8B. In another embodiment, dynamic weight accumulation is enabled on a FGIO scheduler hierarchy. Weight accumulation is performed upon occurrence of an event, such as when any leaf scheduler becomes active or inactive. In such cases, weights are calculated and propagated for leaf nodes to AdmitWrite, AdmitRead, and Continue schedulers when a volume becomes active or inactive.

In one embodiment, the weight of leaf schedulers (at the bottom level of the scheduler hierarchy) and the scheduler which triggers dynamic weight accumulation does not change. For example, in one embodiment, the weight of leaf schedulers (e.g., volumes) is of value 1, and does not have a multiplier, or has a multiplier of 1. In that case, all volumes are treated similarly throughout the scheduler hierarchy with the same priority. Though the leaf scheduler has a multiplier of 1 or does not have a multiplier, levels above the bottom level including leaf schedulers may have multipliers of 1 or greater than 1. Further, in one embodiment, the corresponding weight of a corresponding scheduler (e.g., leaf scheduler, volume, admit, continue, etc.) is based on a predetermined input/output per second (IOPS) value for the corresponding scheduler.

Figure 9B:
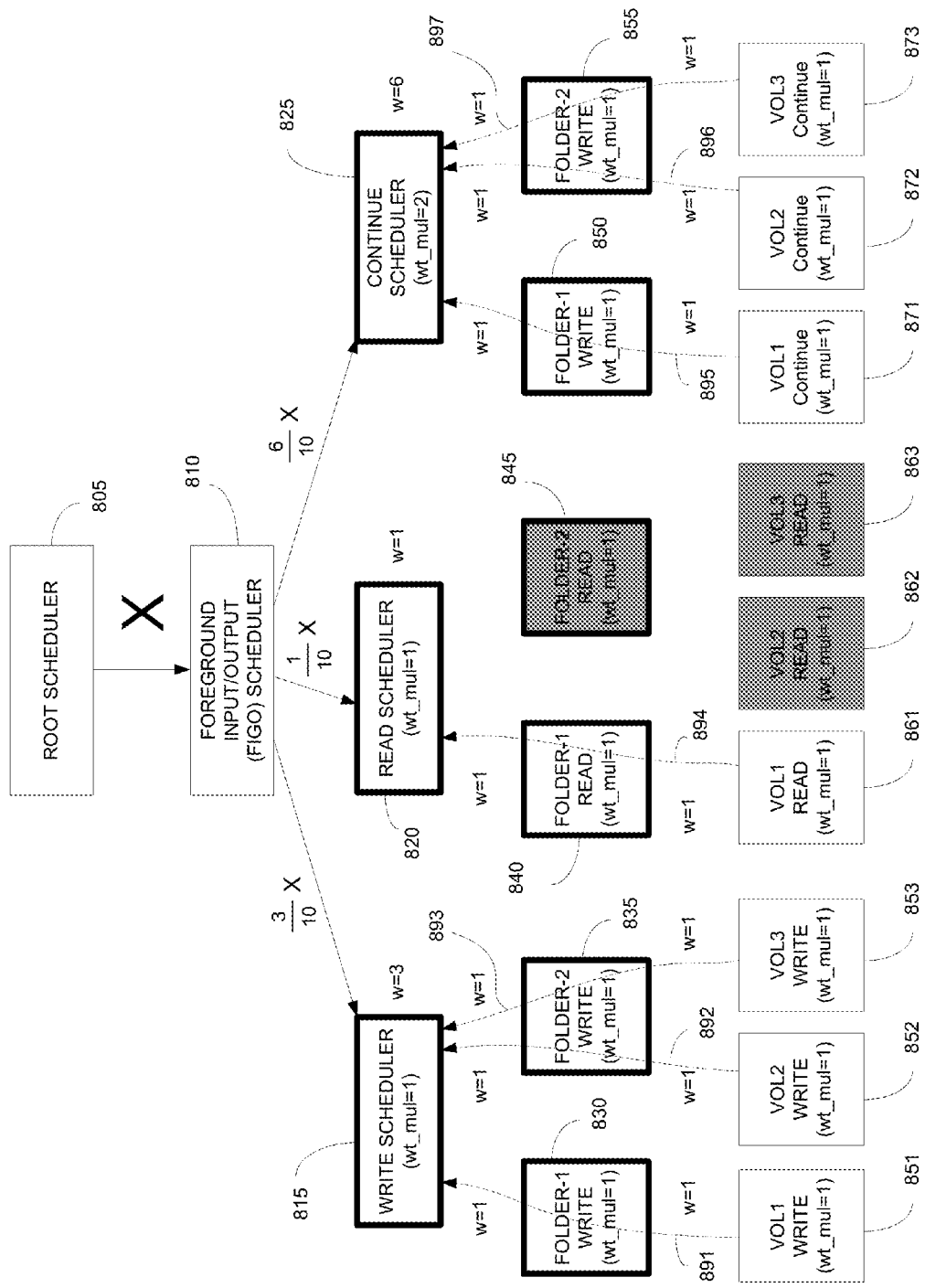
FIG. 9B illustrates an exemplary application of dynamic weight accumulation of operation through a scheduler hierarchy wherein a weight of a leaf scheduler is propagated upwards through its corresponding chain of schedulers using dynamic weight accumulation (DWAC), in accordance with one embodiment of the present disclosure.

It is important to note that the dynamic weight accumulation (DWAC) may be calculated using different approaches. For example, the weights of a leaf scheduler (e.g., volume) may be propagated upwards and factored with corresponding multipliers through a chain of schedulers. These weights are then accumulated at the top level (e.g., admit and continue schedulers), factored with a corresponding multiplier, to determine a final weight for the corresponding scheduler (e.g., admit or continue schedulers). This process is shown in FIGS. 9A and 9B.

FIG. 9A is a flow diagram 900 illustrating another method for allocating resources based on dynamic weight accumulation performed in a bottom-up fashion in a scheduler hierarchy of a data storage system, such that weights of schedulers are propagated upwards through the scheduler hierarchy, in accordance with one embodiment of the present disclosure. In one embodiment, flow diagram 900 is implemented within controller 104 of FIG. 1, and more particularly the hierarchical fair CPU scheduler 124 or hierarchical fair disk access scheduler 126 of FIG. 1, or active controller 206 of FIG. 2, FGIO schedulers 660 and 632 of FIGS. 6A-6C.

At operation 910, the method includes assigning a plurality of weights to a plurality of leaf schedulers at a bottom level of schedulers in a scheduler hierarchy. The scheduler hierarchy includes a plurality of levels of schedulers. In the scheduler hierarchy, between two levels of schedulers with schedulers having a parent/child relationship (e.g., between a parent scheduler of a parent level and one or more children at a child level) each parent scheduler at a corresponding parent level is associated with a unique plurality of children schedulers.

As previously described, FIG. 8A shows an exemplary scheduler hierarchy, wherein the top or root level includes a foreground IO (FGIO) scheduler. The scheduler hierarchy also includes a first sub-level below the top level. The first sublevel includes a AdmitRead scheduler, an AdmitWrite scheduler, and a Continuing scheduler. The scheduler hierarchy also includes a second sublevel below the first sublevel. The second sub-level includes a plurality of folders, each of which is associated with one of the AdmitRead scheduler and AdmitWrite scheduler. The scheduler hierarchy also includes a third sublevel below the second sublevel. In particular, the third sublevel includes a plurality of volumes, each of which is associated with one of the plurality of folders and the continuing scheduler. That is, some volumes are children to a corresponding folder (wherein the folder is a child of an admit scheduler), and some volumes are children directly to the continuing scheduler without an intervening folder.

In the method, for each leaf scheduler that is active, operation 920 includes propagating a corresponding weight of a corresponding leaf scheduler upwards in the scheduler hierarchy through a corresponding chain of schedulers.

Operation 920 is applied recursively through the scheduler hierarchy, such that a corresponding scheduler at a corresponding level is associated with an accumulation of weights of its descendent schedulers from all lower levels. In one embodiment, for the corresponding scheduler of the corresponding level, a multiplier is factored in, such that the multiplier is applied to the accumulated weights of its descendants (including all of its children and their descendants) that is propagated upwards to generate a multiplied value. In the recursive process, the multiplied value is propagated upwards through the corresponding chain of schedulers.

FIG. 9B illustrates an exemplary application of dynamic weight accumulation of operation 920 through a scheduler hierarchy wherein a weight of a leaf scheduler is propagated upwards through its corresponding chain of schedulers using dynamic weight accumulation (DWAC), in accordance with one embodiment of the present disclosure. FIG. 9B is based on the same scheduler hierarchy introduced previously in FIG. 8A. As previously described, weights of leaf schedulers in a scheduler hierarchy are propagated upwards only till the children of the FGIO scheduler, and not to the FGIO scheduler. For example, beginning with VOL1 851, the volume scheduler has a weight of 1, and multiplier of 1. As such, the weight of VOL1 851 equals 1, after factoring in its multiplier, and this weight is propagated upwards through a chain of schedulers (indicated by dotted line 891) including write VOL1 851, write folder-1 830 and AdmitWrite scheduler 815 using DWAC. As such, in the recursive process, the final weight of write Vol1 851 is propagated upwards to write folder-1 830. The multiplier (value of 1) for write folder-1 830 is then applied to the weight that is propagated upwards using DWAC. Since the multiplier is 1 at write folder-1 830, the weight propagated upwards to AdmitWrite scheduler 815 in the chain of schedulers beginning with write VOL1 851 is a value of 1.

Similarly, the weight of write VOL2 852 is propagated upwards through its chain of schedulers (indicated by dotted line 892) using DWAC, such that the weight propagated upwards to AdmitWrite scheduler 815 in the chain of schedulers beginning with write VOL2 852 is a value of 1. Also, the weight of write VOL3 853 is propagated upwards through its chain of schedulers (indicated by dotted line 893) using DWAC, such that the weight propagated upwards to AdmitWrite scheduler 815 in the chain of schedulers beginning with write VOL3 853 is a value of 1. Further, the weight of read VOL1 861 is propagated upwards through its chain of schedulers (indicated by dotted line 894) using DWAC, such that the weight propagated upwards to AdmitRead scheduler 820 is a value of 1.

Also, the weight of continue VOL1 871 is propagated upwards through its chain of schedulers (indicated by dotted line 895) using DWAC, such that the weight propagated upwards to Continue scheduler 825 is a value of 1. In particular, the volume scheduler 871 has a weight of 1, and multiplier of 1. As such, the weight of VOL1 871 equals 1, after factoring in its multiplier, and this weight is propagated upwards through a chain of schedulers (indicated by dotted line 895) including continue VOL1 871, continue folder-1 850 and Continue scheduler 825 using DWAC. As such, in the recursive process, the final weight of write VOL1 871 is propagated upwards to continue folder-1 850. The multiplier (value of 1) for continue folder-1 850 is then applied to the weight that is propagated upwards using DWAC. Since the multiplier is 1 at continue folder-1 850, the weight propagated upwards to Continue scheduler 825 in the chain of schedulers beginning with write VOL1 871 is a value of 1. Further, the weight of continue VOL2 872 is propagated upwards through its chain of schedulers (indicated by dotted line 896) using DWAC, such that the weight propagated upwards to Continue scheduler 825 in the chain of schedulers beginning with continue VOL2 872 is a value of 1. Also, the weight of continue VOL3 873 is propagated upwards through its chain of schedulers (indicated by dotted line 896) using DWAC, such that the weight propagated upwards to Continue scheduler 825 in the chain of schedulers beginning with continue VOL3 873 is a value of 1.

Dynamic weight accumulation (DWAC) is performed at AdmitWrite scheduler 815, such that the weights propagated from its leaf schedulers (write VOL1 851 of weight 1, write VOL2 852 of weight 1, and write VOL3 853 of weight 1) are propagated upwards using DWAC, accumulated (1+1+1=3), and factored by its multiplier (1) to determine a final weight for AdmitWrite scheduler 815 which equals 3. A similar process is performed for AdmitRead scheduler 820, such that the weights propagated from its leaf schedulers (read VOL1 861 of weight 1) is propagated upwards using DWAC, accumulated (1), and factored by its multiplier (1) to determine a final weight for AdmitRead scheduler 820 which equals 1. Read folder-2 845 and its corresponding child schedulers (read VOL2 862 and read VOL3 863) are inactive, and as such weights are not propagated upwards. A similar process is performed for Continue scheduler 825, such that the weights propagated from its leaf schedulers (continue VOL1 871 of weight 1, continue VOL2 872 of weight 2, continue VOL3 873 of weight 3) is propagated upwards using DWAC, accumulated (1+1+1=3), and factored by its multiplier (2) to determine a final weight for Continue scheduler 825 which equals 6.

In the method of FIG. 9, at operation 930, a given set of resources assigned to the scheduler sub-hierarchy is distributed based on the accumulated weights at each level, such that a corresponding scheduler is proportioned resources from the given set of resources based on the accumulation of weights of its descendent schedulers. In the example of FIG. 9B, the given set of resources given to FGIO scheduler 810 by the root scheduler 805 is represented by "X." The given set of resources (e.g., CPU cycles) is proportioned to AdmitWrite scheduler 815, AdmitRead scheduler 820, and Continue scheduler 825 based on their final weights. Since all of the given set of resources is distributed, AdmitWrite scheduler 815 receives 3/10 X, AdmitRead scheduler 820 receives 1/10 X, and Continue scheduler 825 receives 6/10 X. These resources are similarly proportioned underneath each of the AdmitWrite scheduler 815, AdmitRead scheduler 820, and Continue scheduler 825, and corresponding volumes based on the accumulated weights at each level.

Dynamic Core Accumulation

Generally speaking, the various embodiments of the present disclosure describe systems and methods that provide for the allocation of resources based on dynamic core accumulation in a scheduler hierarchy of a data storage system. In particular, when scheduling tasks to be executed on physical and/or logical threads of a controller of a data storage system, short-lived tasks (e.g., user IOs) may be scheduled behind system IOs that are currently executing or scheduled for execution. Controller systems having statically assigned core processors that are dedicated for executing system IOs are unable to match the demand of short-lived tasks, especially when the system receives a burst of user IOs. In embodiments of the present invention, a set of core processors (e.g., physical and/or logical) are dynamically allocated cores based on a current utilization of a resource. The allocation of resources in the set may be available generally for all system IOs, in one embodiment. In another embodiment, one or more sets are defined, each of which is allocated resources based on a current utilization of a corresponding resource. Embodiments of the present invention can be implemented within and/or in conjunction with the systems and methods described previously in FIGS. 1-9.

Figure 10A:
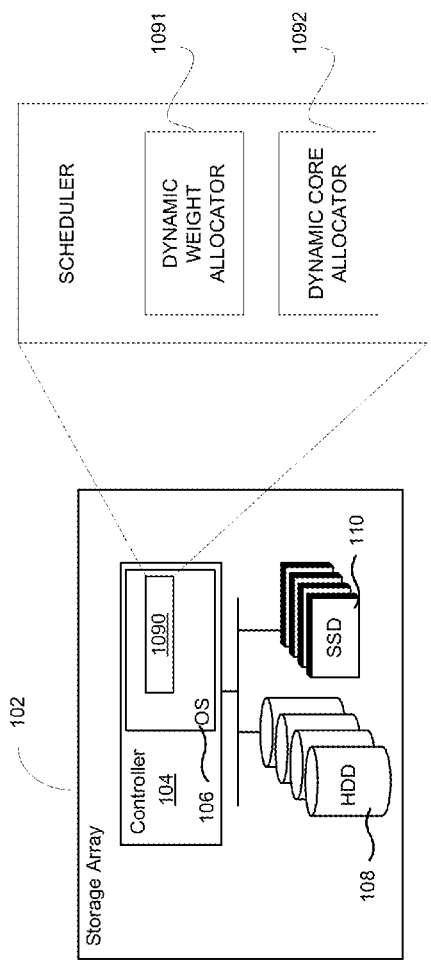
FIG. 10A depicts network storage, that is implementable within the system of FIG. 1, that is configured for allocation of resources based on dynamic core allocation (DCA) in a scheduler hierarchy of a data storage system, in accordance with one embodiment of the present disclosure.

FIG. 10A depicts network storage 102, that is configured for allocation of resources based on dynamic core allocation (DCA) in a scheduler hierarchy of a data storage system, in accordance with one embodiment of the present disclosure. As previously introduced, network storage 102 is implementable within the system of FIG. 1, in some embodiments. The network storage 102, also referred to as storage array or data storage system, includes a controller 104 with a storage operating system 106, which is a multitasking system able to execute several tasks concurrently. One or more tasks are configured to process IO requests that may be classified as user IOs and system IOs. For example, user IOs include tasks requested by a user or client (e.g., read and write requests) of the network storage 102. System IOs include background tasks, such as system maintenance tasks (e.g., processing an alert when resource consumption reaches a threshold, taking a scheduled snapshot, garbage collection, etc.). System IOs may also include resource generating tasks, that when executed free the resources consumed by the user IOs (e.g., writes). For example, resource generating tasks include NVRAM drainer (also referred to as NVRAM flush), disk space manager (e.g., performing index merging, garbage collection), autogen, Dbb Sync, DI Sync, CI Sync, FI Sync, deletions, Disk GC, Flash GC, etc. In particular, operating system 106 is configured to perform allocation of resources based on DCA in a scheduler hierarchy.

In embodiments, the network storage 102 may be configured in one or many configurations. For example, in some embodiments network storage 102 may be configured as a hybrid system including solid state drives (SSDs) and one or more hard disk drives (HDDs) that perform NVRAM, cache, and permanent storage functionalities. In other embodiments, the network storage 102 may be configured as an all flash array (AFA) including SSDs that perform NVRAM, cache, and permanent storage functionalities. For ease of illustration, network storage 102 implementing allocation of resources based on DCA in a scheduler hierarchy may be described in relation to a hybrid system, but is equally applicable to AFA data storage systems.

As shown in FIG. 10A, network storage 102 includes one or more memory controllers 104, one or more HDDs 108, and one or more SSDs 110 (e.g., flash cache). In one embodiment, the storage operating system 106 executing in controller 104 includes a scheduler 1090 that is configured for allocating resources based on DCA. In one embodiment, scheduler 1090 may be implemented within a QoS manager.

Scheduler 1090 includes a dynamic weight allocator 1091 that is configured to dynamically assign weights to various tasks depending on priority. That is, the assigned weights define priority between tasks (e.g., a task given a larger weight has more priority over a task given a lesser weight). Weights may be assigned to foreground tasks (user IOs) and/or background tasks (system IOs). In addition, scheduler 1090 includes a dynamic core allocator 1092 that is configured to dynamically assign core processors (physical and/or logical) to a set of resources that is configured for execution of system IOs based on a current utilization of a resource, in accordance with one embodiment of the present disclosure. As will be described further in relation to FIG. 13A, the determination of weights by the dynamic weight allocator 1091 may be related to the consumption or utilization of corresponding resources, such that a given weight for a corresponding task may be a factor in determining how many core processors (physical and/or logical) should be assigned for the execution of tasks (e.g., user IOs and/or system IOs) at any given time, as determined by the dynamic core allocator 1092. In embodiments, dynamic weight allocator 1091 functions similarly as dynamic weight allocator 139 and/or dynamic weight allocator 140 of FIG. 1.

Figure 10B:
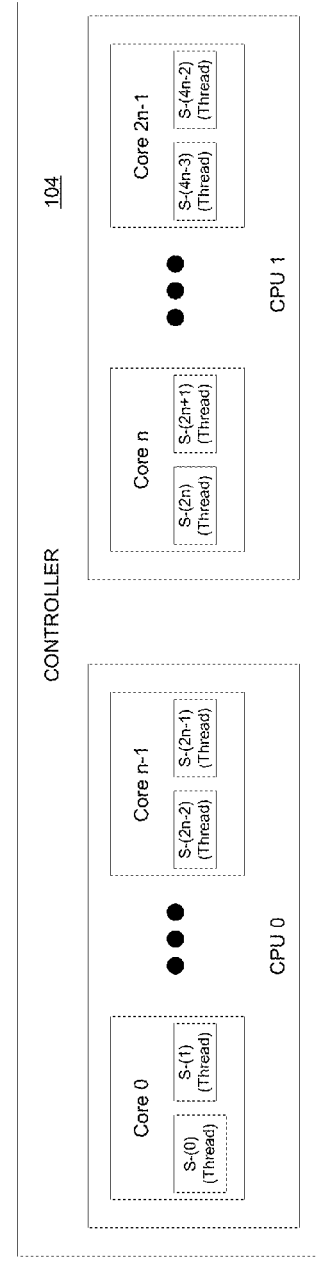
FIG. 10B illustrates a controller of a data storage system including core processors and/or logical thread processors of a data storage system, in accordance with one embodiment of the present disclosure.

FIG. 10B illustrates a controller 104 of a data storage system 102 including core processors and/or logical thread processors of a data storage system, in accordance with one embodiment of the present disclosure. As shown, controller 104 may have two sockets, each of which is configured to connect with a corresponding CPU (e.g., CPU 0, CPU 1). Each CPU includes "n" core processors, wherein the core processors are physical processors.

In addition, each core processor may be configured as a multi-core processors including with one or more logical threads executing concurrently. In that manner, execution of multiple threads increases the utilization of a corresponding core processor. For purposes of illustration, each core processor includes two logical threads, though the number of threads per core processor is selectable. As shown, each CPU includes 2n logical threads (e.g., numbered S-[0] to S-[2n−1] for CPU 0). In some configurations, the CPU is configured directly into one or more logical threads. In still other embodiment, of course other configurations for controller 104 are possible, with variations in the number of sockets, CPUs, logical threads, etc. available.

Figure 11A:
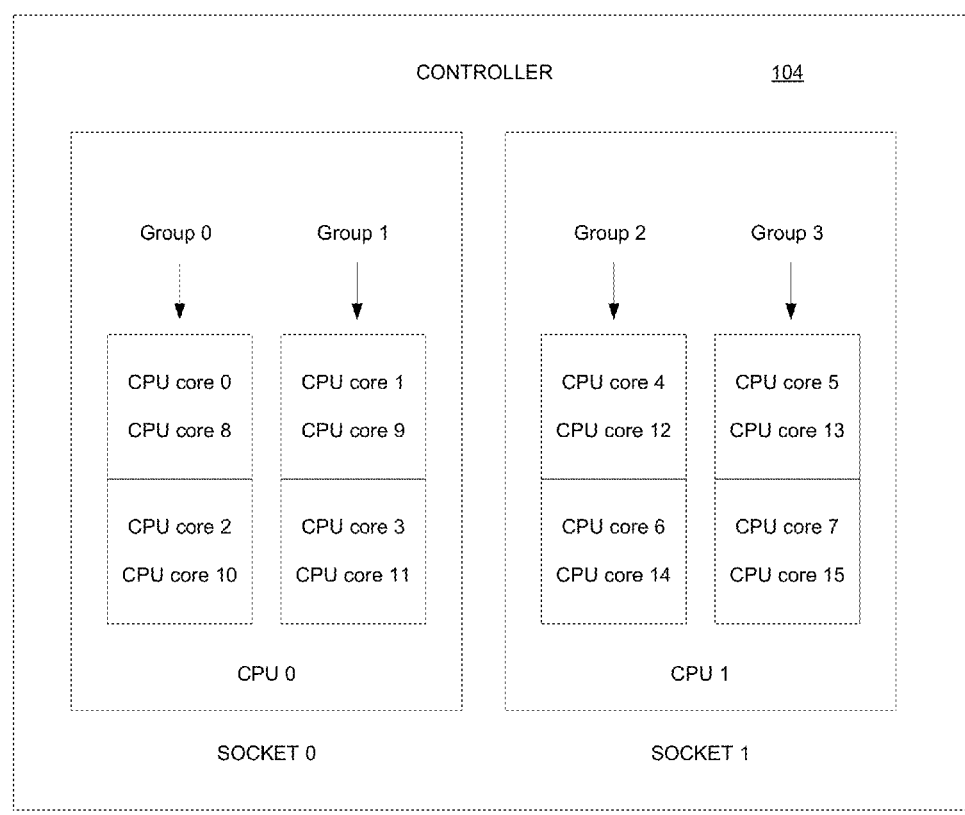
FIG. 11A illustrates the implementation of scheduler groups in a controller of a data storage system configured for allocation of resources based on DCA, in accordance with one embodiment of the present disclosure.

FIG. 11A illustrates the implementation of scheduler groups in a controller 104 of a data storage system 102 as shown in FIGS. 10A-10B, wherein the controller is configured for allocation of resources based on DCA, in accordance with one embodiment of the present disclosure. In particular, core processors of a corresponding CPU are grouped into one or more scheduler groups. The number of scheduler groups is a multiple of the number of sockets in the controller 104 of the data storage system 102, in one embodiment. In addition, a scheduler group includes core processors from a single socket and corresponding CPU. That is, a scheduler group does not include core processors from multiple sockets and/or CPUs.

In one embodiment, on each socket, available core processors are assigned to scheduler groups in round robin order. For example, controller 104 shown in FIG. 11A includes two sockets (e.g., socket 0 and socket 1). Each socket is associated with a corresponding CPU (i.e., a CPU is inserted into a corresponding socket). For example, socket 0 is associated with CPU 0, and socket 1 is associated with CPU 1. In addition, each CPU has eight core processors. For example, in a two CPU controller there are sixteen core processors numbered 0-15. As shown, CPU 0 has cores 0-3 and 8-11, whereas CPU 1 has cores 4-7 and 12-15.

In an example where two scheduler groups are defined per socket and corresponding CPU, four scheduler groups are necessary for controller 104. For example, scheduler groups 0 and 1 are assigned to socket 0 and/or CPU 0, and scheduler groups 2 and 3 are assigned to socket 1 and/or CPU 1. In one embodiment, core processors are assigned to groups in round robin fashion. For example, in the example where two scheduler groups are defined per socket, group 0 includes core processors 0, 2, 8, and 10; and group 1 includes core processors 1, 3, 9, and 11, wherein groups 0 and 1 are associated with socket 0. In addition, group 2 includes core processors 4, 6, 12, and 14; and group 3 includes core processors 5, 7, 13, and 15, wherein groups 2 and 3 are associated with socket 1.

In addition, logical threads can also be assigned to scheduler groups. In one embodiment, logical threads are assigned to the same group as its corresponding core processor. That is, if some core processor "k" is assigned to a scheduler group, then its associated logical threads (pair of threads in FIG. 10B) are also assigned to the same scheduler group.

Figure 11B:
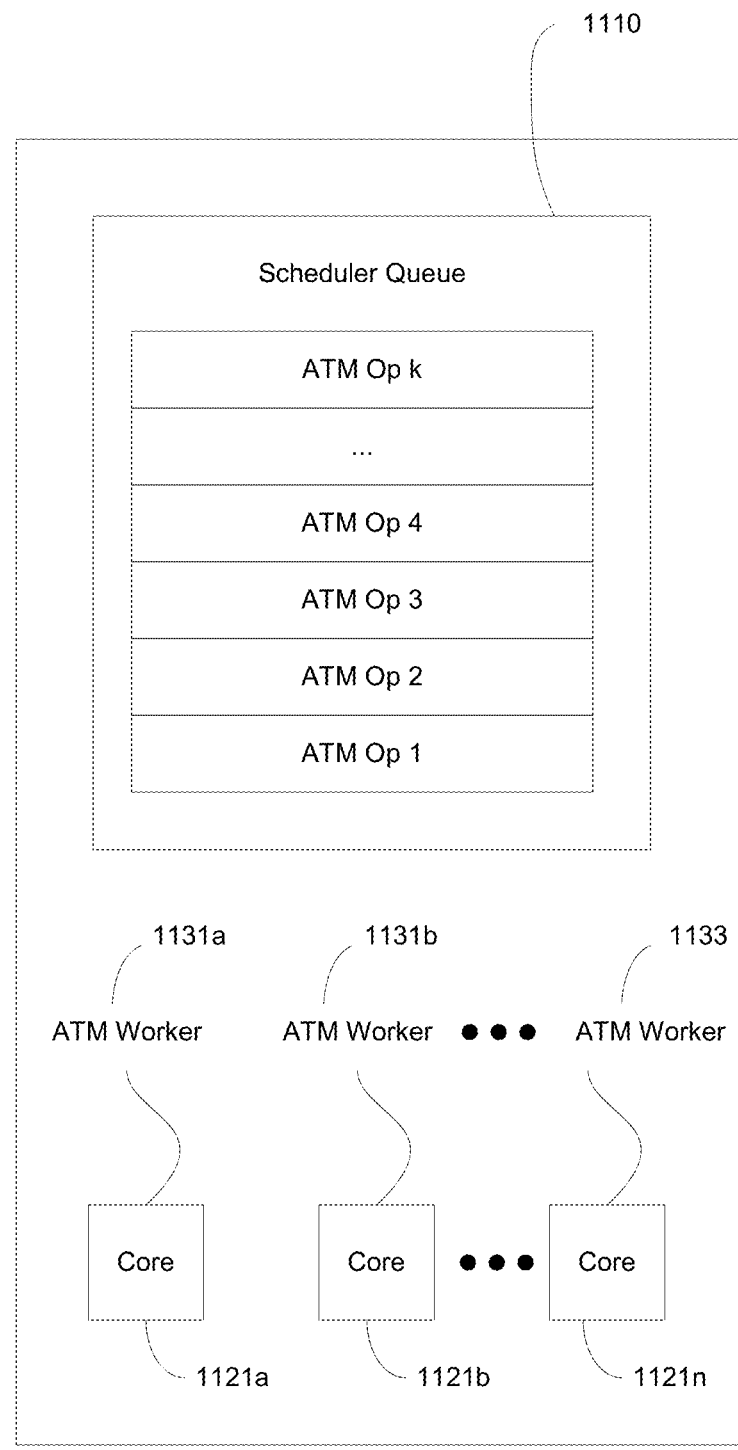
FIG. 11B illustrates a scheduler queue of a scheduler group in a controller of a data storage system configured for allocation of resources based on DCA, in accordance with one embodiment of the present disclosure.

FIG. 11B illustrates a scheduler queue 1110 of a scheduler group in a controller 104 of a data storage system 102 configured for allocation of resources based on DCA, in accordance with one embodiment of the present disclosure. The scheduler groups in controller 104 were previously introduced in FIGS. 10A-10B and 11A. In particular, one scheduler queue is created per scheduler group. That is, queue 1110 is associated with a scheduler group (not shown), and includes operations (e.g., tasks) numbered 1-$k$. In one embodiment, worker threads (formatted for communications using asynchronous task manager [ATM]) associated with the grouped core processors work on this single, scheduler queue 1110. For example, scheduler queue 1110 is associated with a scheduler group including core processors 1121a-1121n. As such, tasks in the scheduler queue 1110 (e.g., ATM Ops 1-k) are scheduled on corresponding ATM worker threads 1131A-1131n of core processors 1121a-1121n.

Figure 12:
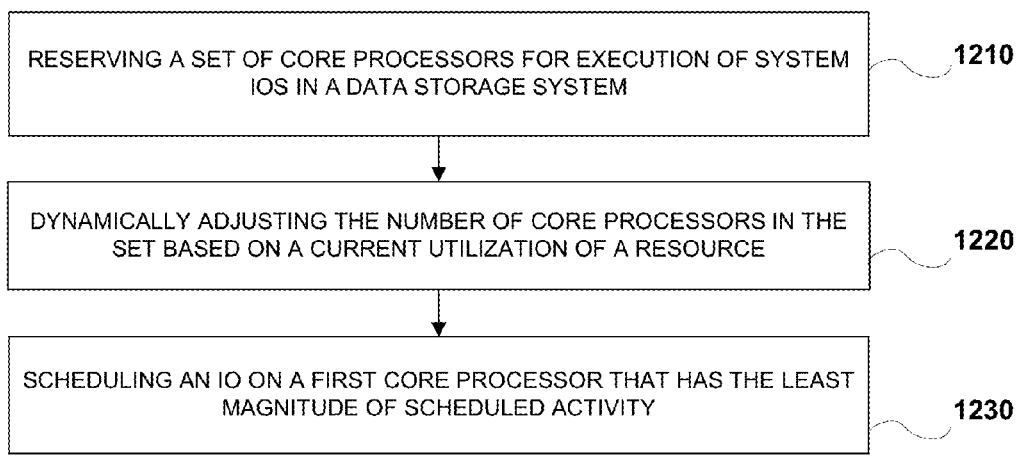
FIG. 12 is a flow diagram illustrating steps in a method for dynamic allocation of physical core processors and/or logical core processors available for scheduling and executing system IOs, in accordance with one embodiment of the present disclosure.

FIG. 12 is a flow diagram 1200 illustrating steps in a method for dynamic allocation of physical core processors and/or logical core processors available for scheduling and executing system IOs, in accordance with one embodiment of the present disclosure. That is, flow diagram 1200 implements DCA within a controller of a data storage system. In one embodiment, flow diagram 1200 is implemented within controller 104 of FIG. 10A, and more particularly within the scheduler 1090.

Embodiments of the present invention introduce DCA in a scheduler hierarchy to allocate resources based on resource allocation. In particular, scheduler groups (previously introduced) and in turn, core processors, are allocated to some background tasks (e.g., system IOs) dynamically as per their corresponding weights (assigned using dynamic weight allocation).

In operation 1210, the method includes reserving a set of core processors for execution of system IOs (e.g., background tasks, resource generating tasks, etc.) in a data storage system. The set includes one or more core processors, and is taken from a plurality of core processors available for executing tasks (e.g., user IOs and system IOs). That is, the set is included within the plurality of core processors. In one embodiment, the plurality of core processors includes physical core processors, and/or logical processors (e.g., threads). Similarly, the set includes physical core processors and/or logical processors. In one embodiment, while the set of core processors is reserved for scheduling system IOs for execution, the set can also be scheduled for user IOs. However, system IOs can only be scheduled onto core processors (or scheduler groups) within the set of core processors.

In addition, the data storage system includes a controller including non-volatile memory (NVRAM) for handling IOs and a central processing unit (CPU) having a plurality of core processors, a solid state memory (SSD) configured as a read cache memory, and permanent data storage. In one embodiment, the permanent data storage includes SSDs, such that the overall data storage system is configured in an AFA configuration or array. In another embodiment, the permanent data storage includes HDDs, such that the overall data storage system is configured in a hybrid configuration or array (e.g., combination of SSDs and HDDs).

In operation 1220, the method includes dynamically adjusting the number of core processors in the set based on a current utilization of a resource. As will be further described in FIGS. 14A-14B, the current utilization of a corresponding resource is based on a dynamic weight of a related system IO that utilizes the resource. That is, the dynamic weight reflects the current utilization of the resource. In that manner, the number of core processors dynamically assigned to a set may be determined based on the dynamic weight that is allocated to a particular task.

In addition, the set may include core processors of one or more scheduler groups, in one embodiment. That is, the set consists of core processors from these assigned scheduler groups, and as the set dynamically increases or decreases, core processors from these scheduler groups are added or removed. In that manner, system IOs can be scheduled to core processors (physical and/or logical) associated with one or more scheduler groups.

In one embodiment, core processors are dynamically allocated (and deallocated) to a corresponding set of core processors, wherein the set is generally available for all system IOs. That is, the size of the set is based on the utilization of a specific resource, and core processors contained therein are available to all the system IOs.

In another embodiment, the number of core processors allocated to a corresponding task is dependent on the current utilization of a corresponding resource. That is, one or more sets are defined, wherein each set is associated with a task/resource pair. As such, for a first set of core processors associated with a first IO (task) and first resource (e.g., the first IO is related to the first resource in that the first IO utilizes the first resource, or may generate or is a producer of the first resource) is allocated or deallocated core processors depending on the utilization of the first resource. For example, the first IO may be Dbb Sync and the first resource is NVRAM, wherein Dbb Sync acts to flush NVRAM, thereby producing NVRAM. That is, the first resource includes NVRAM and the related system IO (e.g., first IO or Dbb Sync) flushes the NVRAM by storing data from NVRAM to permanent storage. Similarly, for a second set of core processors associated with a second IO (task) and second resource (e.g., the second IO is related to the second resource in that the second IO utilizes the second resource, or may generate or is a producer of the second resource) is allocated or deallocated core processors depending on the utilization of the second resource. For example, the second IO may be autogen and the second resource may be "update entries" (UEs), wherein autogen acts to produce UEs. Because these tasks may be dynamically allocated corresponding weights, the set of core processors available to each of these tasks may be different. For example, if user IOs (e.g., burst of writes) suddenly demand more NVRAM with respect to UEs, Dbb Sync will be given a greater weight than autogen, so that producing NVRAM is given higher priority than producing UEs thereby allowing efficient execution of user IOs demanding NVRAM.

Figure 13A:
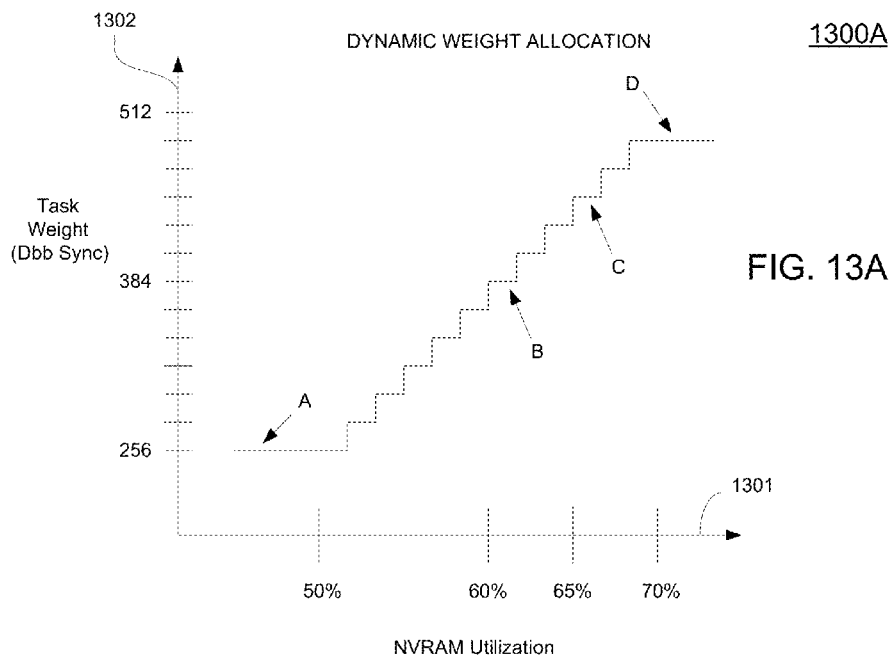
FIG. 13A is a graph illustrating the relationship between a weight of a task and a resource utilization, in accordance with one embodiment of the present disclosure.
Figure 13B:
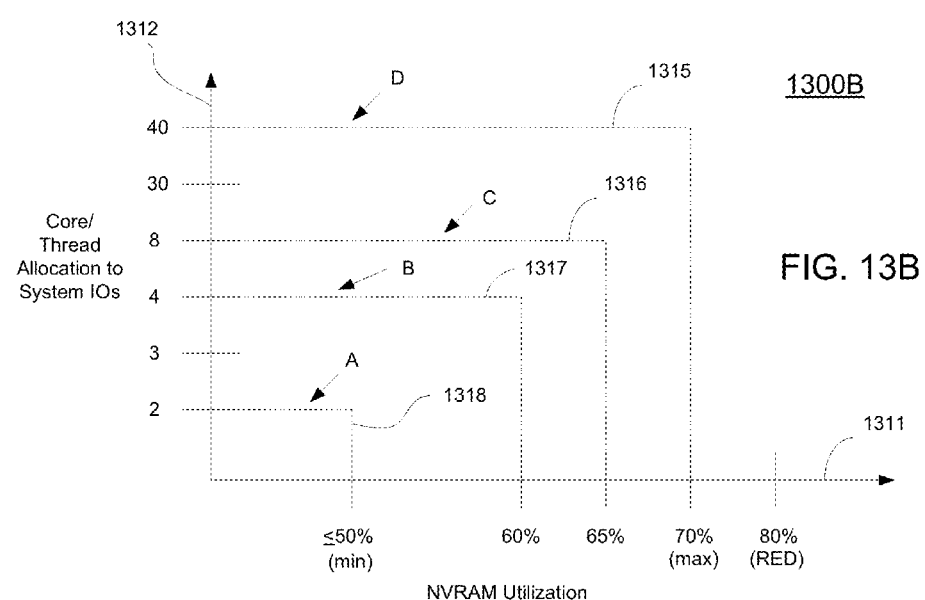
FIG. 13B is a graph illustrating the allocation of physical core processors and/or logical core processors (e.g., threads) available for scheduling and executing system IOs based on a resource utilization, in accordance with one embodiment of the present disclosure.

FIGS. 13A-13B illustrate the relationship between weights of tasks, utilization of corresponding resources, and the dynamic allocation of core processors to one or more sets of resources (e.g., core processors) based on the utilization of corresponding resources (as reflected by the weights of tasks). In one embodiment, DCA scheduler groups (an in turn core processors in those groups) are allocated to some background tasks (e.g., system IOs) dynamically based on their DWA weight.

In particular, FIG. 13A is a graph 1300A illustrating the relationship between a weight of a given task and a resource utilization, in accordance with one embodiment of the present disclosure. The task is related to the resource in that the task utilizes and/or produces the resource. In one embodiment, the task is a system IO (e.g., Dbb Sync) and the resource is related in that the system IO produces the resource (e.g., Dbb Sync produces NVRAM). As shown, graph 1300A includes horizontal axis 1301 that reflects resource utilization (e.g., NVRAM utilization). For example, utilization of NVRAM is shown between 50 percent utilization to above 70 percent utilization. In addition, graph 1300A includes vertical axis 1302 that reflects the task (e.g., Dbb Sync) weight. The weight is defined between a minimum of 256 and a maximum of 512. The values of weights are meant to be illustrative, and can take on any range of values in embodiments.

Graph 1300A shows the relationship between resource utilization and task weight. More particularly, the task weight dynamically assigned to a task is based on the utilization of a corresponding resource. As such, the weight of a task gives an insight as to how much the corresponding resource is being utilized at a particular point in time. For example, given a resource utilization (e.g., NVRAM utilization) of 50 percent, the task weight is dynamically adjusted to the minimum of 256. Also, for resource allocations below 50 percent, the task weight is pinned to the minimum of 256 (point A). Further, for resource allocations above 70 percent, the task weight is pinned to the maximum of 512 (point D). In addition, for resource allocations between 50 and 70 percent, various task weights are given. For example, for resource allocations of approximately 60 percent, the task weight is approximately 384 (see point B), and for resource allocations of approximately 65 percent, the task weight is approximately 448 (see point C).

FIG. 13B is a graph 1300B illustrating the allocation of physical core processors and/or logical core processors (e.g., threads) to a corresponding set, wherein core processors in the set are available for scheduling and executing system IOs (as well as user IOs) based on a resource utilization, in accordance with one embodiment of the present disclosure. As shown, graph 1300B includes horizontal axis 1311 that reflects resource utilization. For example, utilization of NVRAM is shown between 50 percent utilization to above 70 percent utilization. In addition, graph 1300A includes vertical axis 1312 that reflects number of core processors (physical and/or logical) that are dynamically allocated based on the utilization of the resource (NVRAM) at any point in time. The number of core processors assigned is meant to be illustrative, and can take on any range of values in embodiments. In addition, the relationship between the assigned core processors and utilization can be expressed in one or more functions. For example, the relationship may be linear, non-linear, or a combination of the two. In one embodiment, the number of cores allocated to a task, or set associated with that task, increases linearly as its DWA weight increases. For an example of a linear relationship, the DWA weight for a system IO (e.g., DI Sync) may vary between 4 to 128. A weight of 4 will be associated with a minimum amount of core processors. The amount of core processors will increase linearly with its DWA, maxing out at a weight of 128.

Graph 1300B shows the relationship between resource utilization and allocation of core processors. More particularly, the number of core processors in a corresponding set is dynamically assigned based on the utilization of a corresponding resource. As shown, given a resource utilization of 50 percent or below, the number of core processors assigned to the set is dynamically adjusted to the value of two (see point A on connecting line 1318). Also, given a resource utilization of 60 percent, the number of core processors assigned to the set is dynamically adjusted to the value of four (see point B on connecting line 1317). Further, given a resource utilization of 65 percent, the number of core processors assigned to the set is dynamically adjusted to the value of eight (see point C on connecting line 1316). In addition, given a resource utilization of 70 percent or more, the number of core processors assigned to the set is dynamically adjusted to the value of forty (see point D on connecting line 1315). That is, once the resource utilization reaches 70 percent, the maximum number of core processors available in the controller is dynamically allocated to the set in an effort to dramatically produce the corresponding resource (i.e., all resources are directed towards producing the resource).

As previously described, the utilization of a resource used to determine the number of core processors in a set may be reflected in the weight of a corresponding task (e.g., weight of Dbb Sync is related to the utilization of NVRAM). FIGS. 13A and 13B reflect the relationship between resource utilization, task weight, and core processor allocation. For instance, points A-D tie the relationship together between FIGS. 13A and 13B. In particular, for point B, at 60 percent resource utilization, the task weight is approximately 384 (see point B in FIG. 13A), and correspondingly the number of core processors dynamically allocated to the set, which is based on resource utilization, is set to the value of four (see point B in FIG. 13B). Similar relationships are shown for each of points A-D in FIGS. 13A and 13B.

Returning to FIG. 12, in operation 1230, the method includes scheduling an IO on a first core processor of the plurality of core processors that has the least magnitude of scheduled activity. In one embodiment, the IO is scheduled onto a physical core processor. In another embodiment, the IO is scheduled onto a logical core processor (e.g., thread). As will be described below, a system IO can only be scheduled within the set of core processors. On the other hand, a user IO can be scheduled for core processors both inside and outside of the set of core processors. In that manner, because the set of core processors is dynamically allocated, user IOs having higher priorities have a better chance of getting scheduled over system IOs having lower priorities. For example, in a non-preemptive controller of a data storage system, there is less opportunities for user IOs to be scheduled behind long-running system IOs.

In one embodiment, the method includes determining that the IO is a system IO, wherein the IO is scheduled on the first core processor, as previously described. The method includes determining that the first core processor has the least magnitude of scheduled activity in the set of core processors reserved for execution of IOs, wherein the first core processor is included within the set of core processors. That is, because the IO is a system IO, it can only be scheduled on a core processor within the set.

In another embodiment, the method includes determining that the IO is a user IO, wherein the IO is scheduled on the first core processor, as previously described. The method includes determining that the first core processor has the least magnitude of scheduled activity in the plurality of core processors, wherein the plurality includes the set of core processors, as well as core processors outside of the set. That is, because the IO is a user TO, it can be scheduled on any one of the plurality of core processors, and is not limited to either core processors outside of the set, or within the set.

Figure 14A:
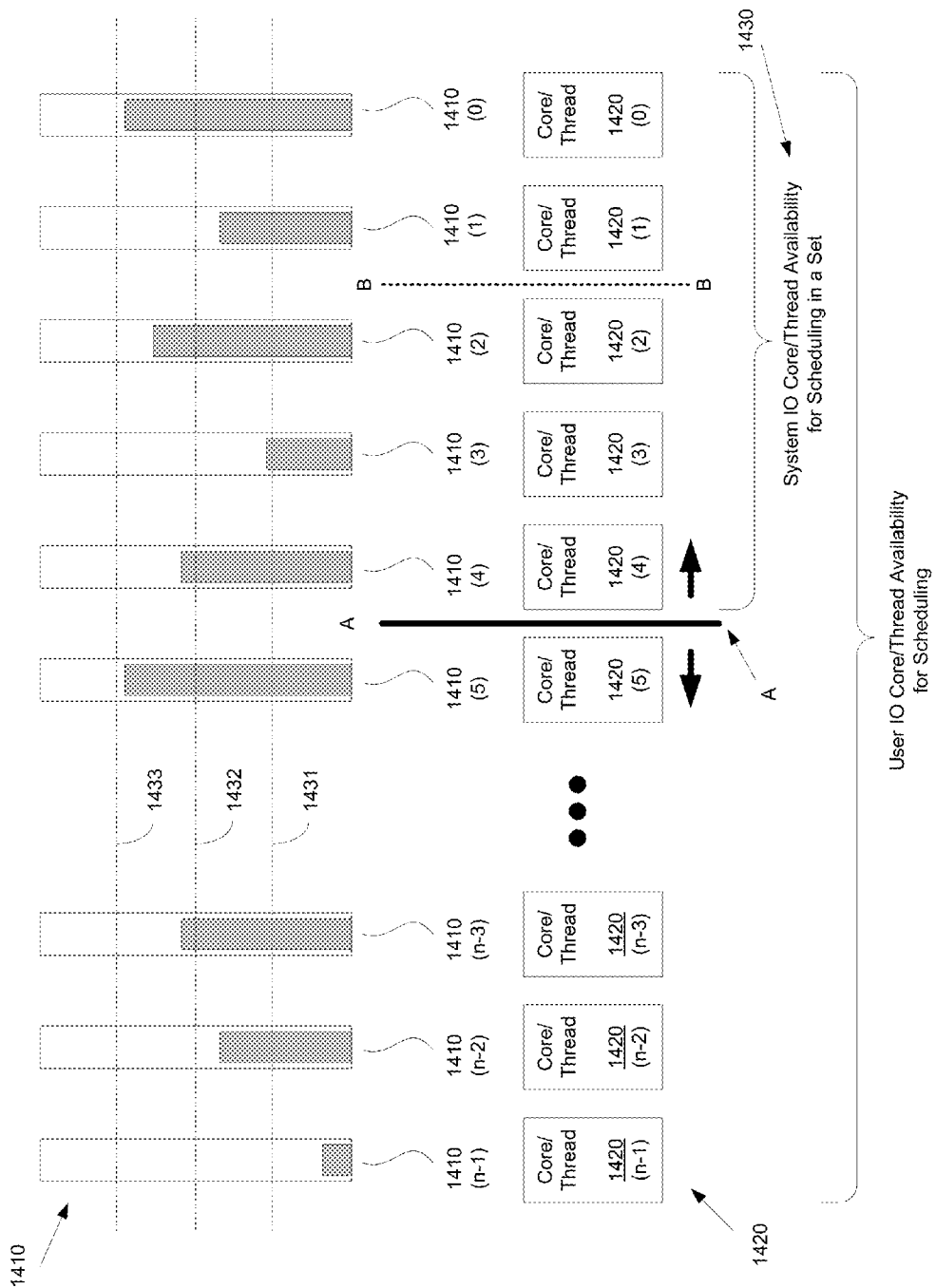
FIG. 14A illustrates dynamic allocation of physical core processors and/or logical core processors (e.g., threads) available for scheduling and executing system IOs (e.g., background tasks, resource generating tasks, etc.) in a controller of a data storage system, in accordance with one embodiment of the present disclosure.

FIG. 14A illustrates the dynamic allocation of physical core processors and/or logical core processors (e.g., threads) available for scheduling and executing system IOs (e.g., background tasks, resource generating tasks, etc.) in a controller of a data storage system, in accordance with one embodiment of the present disclosure. In particular, the controller includes one or more CPUs including a plurality of core processors 1420. The core processors may be physical or logical when scheduling the cores, as previously described. As shown, the plurality of core processors 1420 includes n processors (e.g., 1420(0), 1420(1), 1420(2) . . . 1420(n−1).

In addition, a set of core processors 1430 includes one or more core processors for execution of system IOs and user IOs. System IOs can only be scheduled on core processors in the set 1430, but user IOs can be scheduled on any of the core processors in the plurality of core processors 1420. For example, set 1430 includes core processors 1420(0) to 1420(4), as shown in FIG. 14A. Line A-A indicates that the number of core processors in set 1430 is dynamically allocated and deallocated, such that line A-A can be moved to the left to allocate more core processors, and can also be moved to the right to deallocate core processors from the set. Line B-B shows the minimum number of core processors in set 1430, such that line A-A cannot move past line B-B when moving right. That is, each task is assigned a minimum allowed number of cores in a corresponding set. For purposes of illustration, the minimum number of core processors is of value two, but can take on any value equal to or greater than one.

Scheduling of IOs is based on selection of a core processor having the least magnitude of scheduled activity. In particular, the scheduling of system IOs is based on selection of the core processor that has the least magnitude of scheduled activity in the set of core processors. That is, the core processor selected for scheduling for a system IO is included within the set. On the other hand, the scheduling of user IOs is based on selection of the core processor that has the least magnitude of scheduled activity in the plurality of core processors. That is, the core processor selected for scheduling for a user IO may or may not be part of the set.

In one embodiment, the magnitude of scheduled activity is based on a queue buildup and a service time, as is reflected in Eqn. 1 below. That is, the magnitude is associated with a time. In particular, the queue buildup is the number of tasks in a corresponding queue. That is, each core processor is associated with a queue. For instance, the queue may be the scheduler queue for a scheduler group as shown in FIGS. 11A-11B. In another embodiment, the queue may be specific to a core processor. In any case, each core processor is associated with a corresponding queue buildup. In addition, service time is the average time to execute tasks in the corresponding queue. That is, each task in the queue has an associated estimated time for execution. The service time is the average of the times for executing all the tasks in the queue, such that the service time is an average time for executing any one of the tasks in the queue. As such, the magnitude of scheduled activity is the total time to execute tasks in the corresponding queue of a corresponding core processor, as is reflected in Eqn. 1 below, wherein the total time is an averaged total time (given that the service time is an average time for executing any one of the tasks in the queue).

$$\text{Magnitude} = (\text{queue buildup}) \times (\text{service time}) \quad (1)$$

As shown in FIG. 14A, magnitudes 1410 of each core processor in the plurality of core processors 1420 are shown. For example, magnitude 1410(0) is associated with core processor 1420(0), magnitude 1410(1) is associated with core processor 1420(1) ... magnitude 1410(n-1) is associated with core processor 1420(n-1). The magnitudes are shown in relation to magnitude lines 1431, 1432, and 1433. In particular, magnitude line 1431 is 25 percent of a maximum magnitude, magnitude line 1432 is 50 percent of a maximum magnitude, and magnitude line 1433 is 75 percent of a maximum magnitude.

For example, when scheduling a system IO, the core processor that is selected is taken from the set 1430, including core processors 1420(0) to 1420(4), and has the least magnitude of scheduled activity. If two or more core processors have similar magnitudes that each is the least magnitude of scheduled activity, then one of the core processors can be selected through any type of selection mechanism. As shown in FIG. 14A, core processor 1410(3) has a magnitude of scheduled activity approximately near magnitude line 1431, which is less than any of the magnitudes associated with the remaining core processors in set 1430. As such, core processor 1410(3) is selected for scheduling the system IO. Note that the system IO can only be scheduled by a core processor in set 1430.

In another example, when scheduling a user IO, the core processor that is selected is taken from the plurality of core processors 1420, including core processors 1420(0) to 1420 (n-1), wherein the core processor selected has the least magnitude of scheduled activity. If two or more core processors have similar magnitudes that each is the least magnitude of scheduled activity, then one of the core processors can be selected through any type of selection mechanism. As shown in FIG. 14A (not accounting for hidden core processors), core processor 1410(n-1) has a magnitude of scheduled activity nearing zero, or way below magnitude line 1431, which is less than any of the magnitudes associated with the remaining core processors (showing) in the plurality of core processors 1420.

Figure 14B:
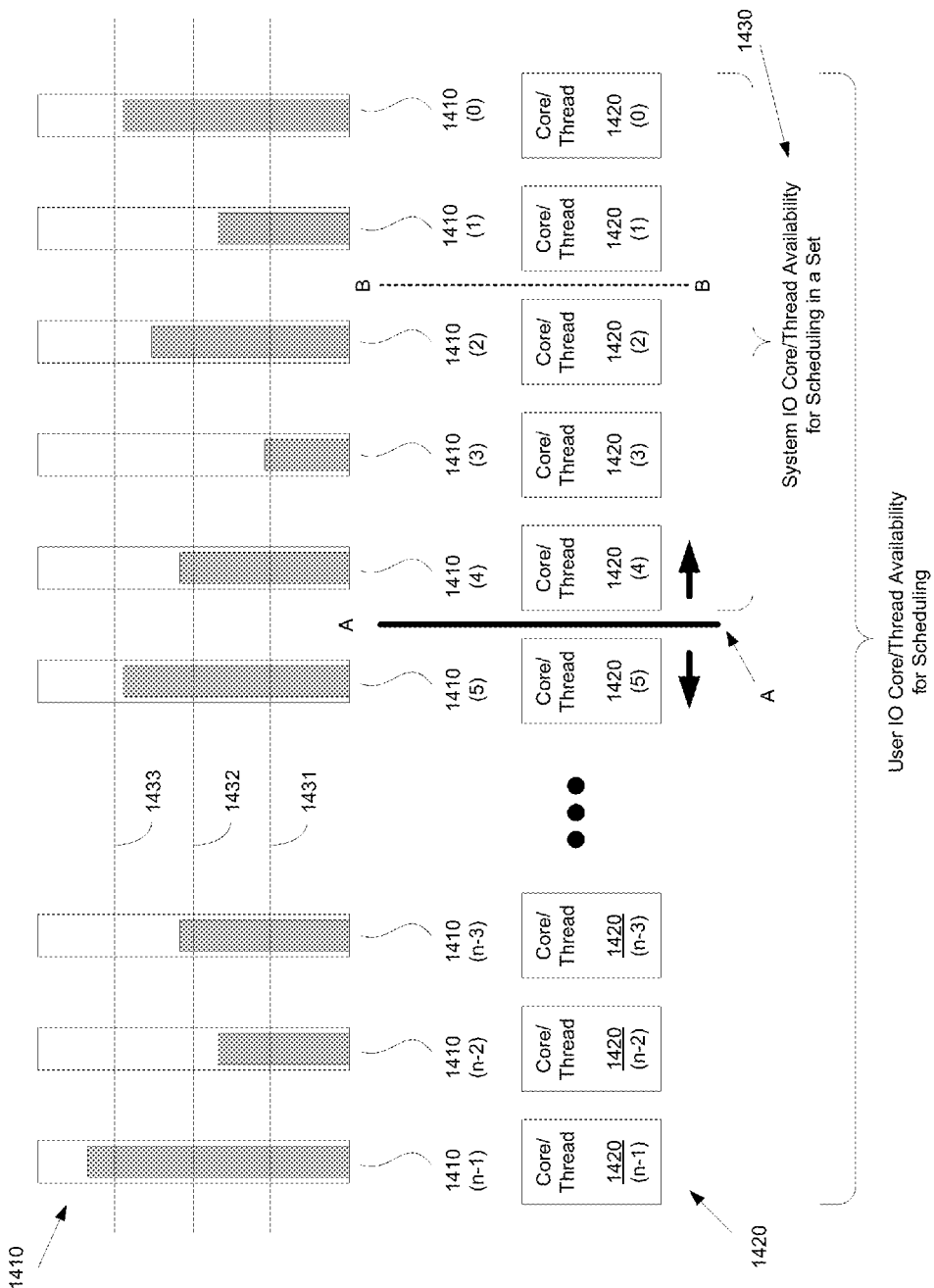
FIG. 14B illustrates the scheduling of a user IO to a core processors included within a set of core processors 1430 of a data storage system configured for dynamic allocation of physical core processors and/or logical core processors (e.g., threads) available for scheduling and executing system IOs (e.g., background tasks, resource generating tasks, etc.) in a controller, in accordance with one embodiment of the present disclosure.

FIG. 14B illustrates the scheduling of a user IO to a core processors included within a set of core processors 1430 of a data storage system configured for dynamic allocation of physical core processors and/or logical core processors (e.g., threads) available for scheduling and executing system IOs (e.g., background tasks, resource generating tasks, etc.) in a controller, in accordance with one embodiment of the present disclosure. In particular, FIG. 14B is similar to FIG. 14A, except the magnitude of scheduled activity 1410(n-1) for core processor 1420(n-1) has been increased to beyond the 75 percent magnitude line 1433 (whereas previously in FIG. 14A the magnitude 1410(n-1) was below the 25 percent magnitude line 1431). In this case, when scheduling a user IO, while the core processor that is selected is taken from the plurality of core processors 1420, the selected core processor 1420(3) is included within the set 1430 because it now has the least magnitude of scheduled activity (magnitude 1410 (3) is approximately equal to the 25 percent magnitude line 1431).

Figure 14C:
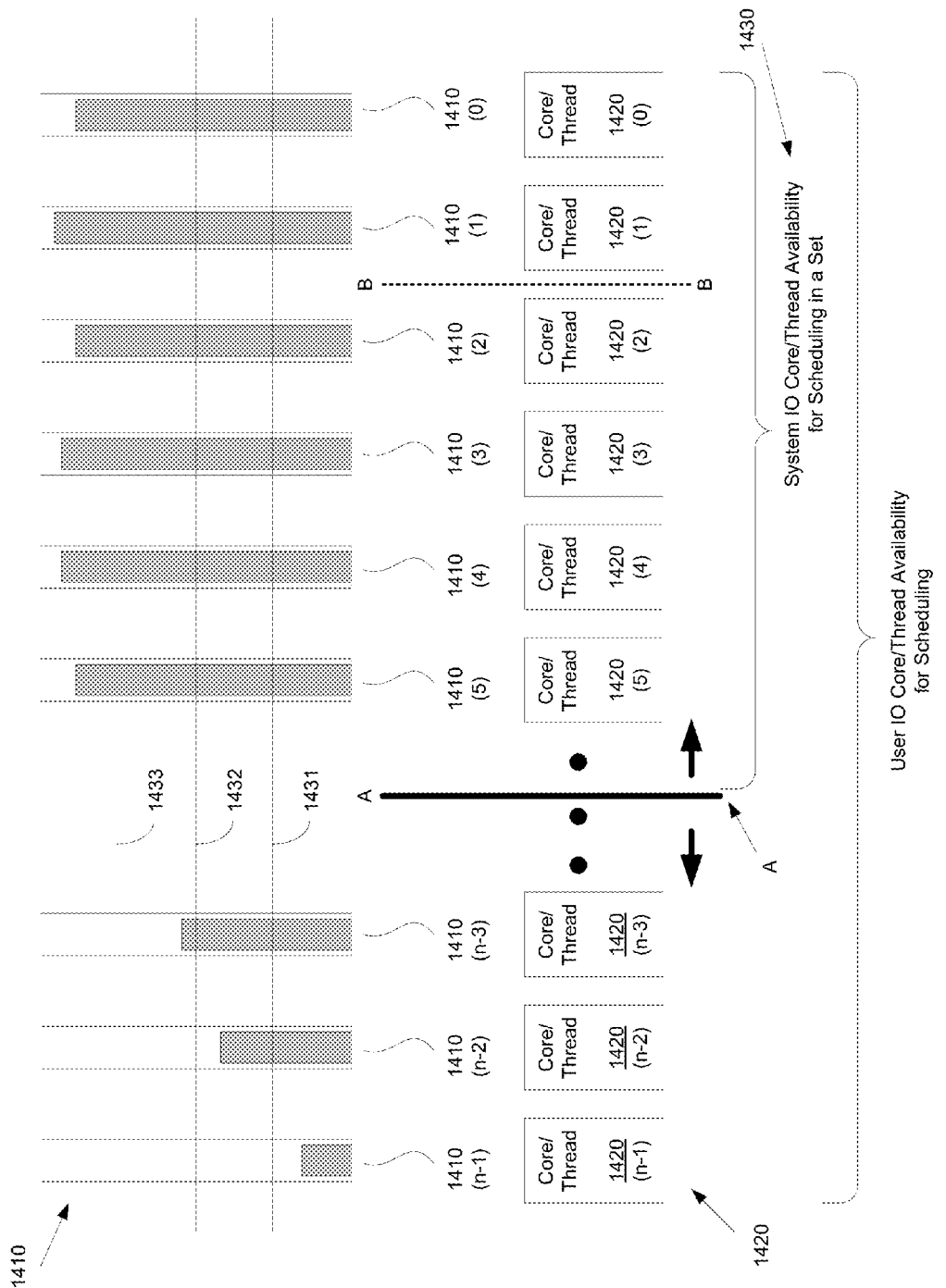
FIG. 14C illustrates the allocation of additional resources (e.g., core processors) included within a set of core processors 1430 of a data storage system configured for dynamic allocation of physical core processors and/or logical core processors (e.g., threads) available for scheduling and executing system IOs (e.g., background tasks, resource generating tasks, etc.) in a controller, in accordance with one embodiment of the present disclosure.

FIG. 14C illustrates the allocation of additional resources (e.g., core processors) included within a set of core processors 1430 of a data storage system configured for dynamic allocation of physical core processors and/or logical core processors (e.g., threads) available for scheduling and executing system IOs (e.g., background tasks, resource generating tasks, etc.) in a controller, in accordance with one embodiment of the present disclosure. As shown in FIG. 14C, the set of core processors 1430 has increased in size from FIGS. 14A-14B. In addition, the utilization of a corresponding resource (e.g., NVRAM) may be high. For example, the system may have received a burst of write IOs. In addition, the magnitude of scheduled activity for core processors in the set 1430 may be high, reflecting the fact that a higher number of system IOs may be scheduled (and possibly given higher priority) in order to produce more of the corresponding resource (e.g., NVRAM). As shown, the magnitudes of core processors in set 1430 are each above the 75 percent magnitude line 1433. In this case, while system IOs are still restricted for scheduling among core processors in the set 1430, the number of core processors in the set has increased. User IOs can still be scheduled by any core processor in the plurality of core processors 1420, but is most likely to be scheduled by core processors outside of set 1430, wherein core processors within set 1430 are highly impacted.

Figure 14D:
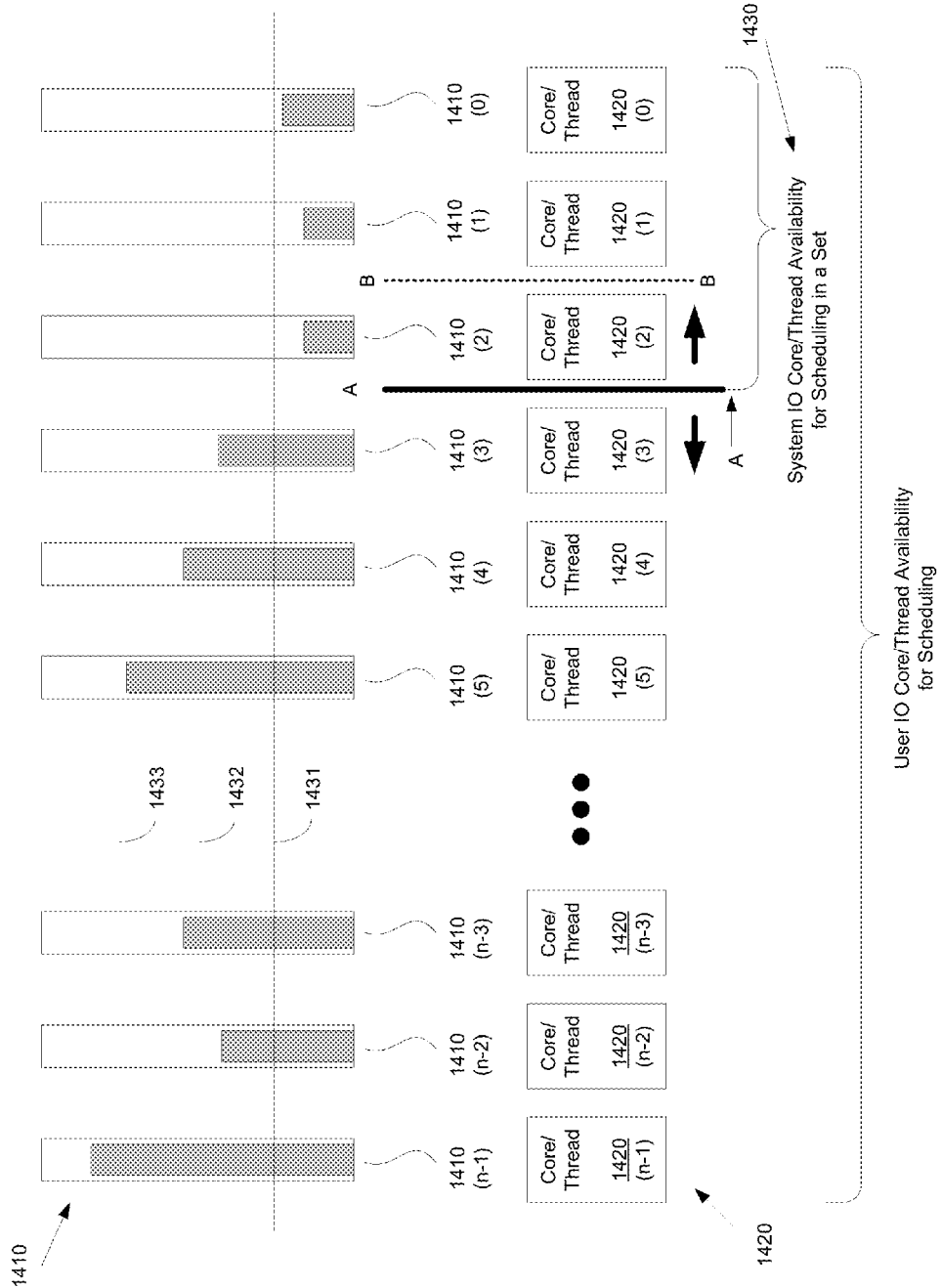
FIG. 14D illustrates the deallocation of additional resources (e.g., core processors) included within a set of core processors 1430 of a data storage system configured for dynamic allocation of physical core processors and/or logical core processors (e.g., threads) available for scheduling and executing system IOs (e.g., background tasks, resource generating tasks, etc.) in a controller, in accordance with one embodiment of the present disclosure.

FIG. 14D illustrates the deallocation of additional resources (e.g., core processors) included within a set of core processors 1430 of a data storage system configured for dynamic allocation of physical core processors and/or logical core processors (e.g., threads) available for scheduling and executing system IOs (e.g., background tasks, resource generating tasks, etc.) in a controller, in accordance with one embodiment of the present disclosure. As shown in FIG. 14D, the set of core processors 1430 has increased in size from FIGS. 14A-14C. In addition, the utilization of a corresponding resource (e.g., NVRAM) may be low due to system inactivity. As a result, the magnitude of scheduled activity for core processors in the set 1430 may be low, reflecting the fact that a lower number of system IOs may be scheduled (and maintaining their low priority). As shown, the magnitudes of core processors in set 1430 are each below the 25 percent magnitude line 1431. In this case, while system IOs are still restricted for scheduling among core processors in the set 1430, the number of core processors in the set has dramatically decreased to near the minimum prescribed for set 1430. User IOs can still be scheduled by any core processor in the plurality of core processors 1420, and may be scheduled by core processors inside of set 1430, wherein core processors within set 1430 are lightly impacted.

Accordingly, embodiments of the present disclosure disclosing the allocation of resources based on dynamic core accumulation in a scheduler hierarchy of a data storage system have been described. While specific embodiments have been provided to demonstrate the fair allocation of resources using dynamic weight accumulation, these are described by way of example and not by way of limitation. Those skilled in the art having read the present disclosure will realize additional embodiments falling within the spirit and scope of the present disclosure.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method comprising:
reserving a set of one or more core processors for execution of system inputs/outputs (IOs) in a data storage system, wherein the data storage system comprises a controller including non-volatile memory (NVRAM) and a central processing unit (CPU) having a plurality of core processors including the set of one or more core processors, a solid state drive (SSD) configured as a read cache memory, and persistent data storage, wherein user IOs are executed on any of the plurality of core processors and system IOs are executed exclusively on the one or more core processors of the set, and wherein the set includes fewer than all of the plurality of core processors;
dynamically adjusting the number of core processors in the set based on a current utilization of a resource;
scheduling a system IO on a core processor of the set of core processors that has the least magnitude of scheduled utilization among the set; and
scheduling a user IO on a core processor of the plurality of core processors that has the least magnitude of scheduled utilization among the plurality of core processors.

2. The method of claim 1, wherein scheduling a system IO comprises:
scheduling the system IO on a thread of the first core processor, wherein the each core processor of the plurality of core processors includes one or more logical threads.

3. The method of claim 1, further comprising:
receiving the system IO for scheduling; and
determining that the received IO is a system IO.

4. The method of claim 1, further comprising:
receiving the user IO for scheduling; and
determining that the received IO is a user IO.

5. The method of claim 1, further comprising:
determining a corresponding magnitude of scheduled utilization for each of the plurality of core processors, wherein the magnitude is based on a queue buildup and a service time.

6. The method of claim 5, wherein the magnitude is a product of queue buildup and the service time, wherein the queue buildup is the number of tasks in a corresponding queue, and wherein the service time is the average time to execute tasks in the corresponding queue, wherein the magnitude is an averaged total time to execute tasks in the corresponding queue.

7. The method of claim 1, further comprising:
determining the current utilization of the resource based on a dynamic weight of a related system IO that utilizes the resource, wherein the dynamic weight reflects the current utilization of the resource.

8. The method of claim 7, wherein the resource comprises the NVRAM, and wherein the related system IO flushes the NVRAM by storing data from the NVRAM to the persistent data storage.

9. The method of claim 7, wherein the resource comprises free space on the persistent data storage, and wherein the related system IO generates more free space on the persistent data storage by compacting existing data.

10. The method of claim 7, wherein the resource comprises unclaimed storage space marked for deletion on the persistent data storage, and wherein the related system IO reclaims the storage space by deleting at least a portion of the unclaimed storage space marked for deletion.

11. The method of claim 1, wherein the data storage system comprises a hybrid array such that the persistent data storage includes hard disk drives (HDDs).

12. The method of claim 1, wherein the data storage system comprises an all flash array, such that the persistent data storage includes SSDs.

13. The method of claim 1, wherein the plurality of core processors comprise a plurality of logical core processors.

14. The method of claim 1, wherein adjusting the number of core processors in the set comprises:
    allocating one or more of the plurality of core processors to the set or deallocating one or more core processors of the plurality from the set.

15. A non-transitory computer-readable medium comprising program instructions to:
    reserve a set of one or more core processors for execution of system inputs/outputs (IOs) in a data storage system, wherein the data storage system comprises a controller including non-volatile memory (NVRAM) and a central processing unit (CPU) having a plurality of core processors including the set of one or more core processors, a solid state drive (SSD) configured as a read cache memory, and persistent data storage, wherein user IOs are executed on any of the plurality of core processors and system IOs are executed exclusively on the one or more core processors of the set, and wherein the set includes fewer than all of the plurality of core processors;
    dynamically adjust the number of core processors in the set based on a current utilization of a resource;
    schedule a system IO on a core processor of the set of core processors that has the least magnitude of scheduled utilization among the set; and
    schedule a user TO on a core processor of the plurality of core processors that has the least magnitude of scheduled utilization among the plurality of core processors.

16. The non-transitory computer-readable medium of claim 15, further comprising program instructions to:
    receive the system TO for scheduling; and
    determine that the received IO is a system IO.

17. The non-transitory computer-readable medium of claim 15, further comprising program instructions to:
    receive the user IO for scheduling; and
    determine that the received IO is a user IO.

18. The non-transitory computer-readable medium of claim 15, further comprising program instructions to:
    determine a corresponding magnitude of scheduled utilization for each of the plurality of core processors,
    wherein the wherein the magnitude is a product of a queue buildup and a service time, wherein the queue buildup is the number of tasks in a corresponding queue, wherein the service time is the average time to execute tasks in the corresponding queue, and wherein the magnitude is an averaged total time to execute tasks in the corresponding queue.

19. The non-transitory computer-readable medium of claim 15, further comprising program instructions to:
    determine the current utilization of the resource based on a dynamic weight of a related system IO that utilizes the resource, wherein the dynamic weight reflects the current utilization of the resource.

20. A data storage system, comprising:
    a controller comprising a non-volatile memory (NVRAM) and a central processing unit (CPU) comprising a plurality of core processors;
    a solid state drive (SSD) configured as a read cache memory;
    persistent data storage; and
    a scheduler executed by the controller to:
        reserve a set of one or more core processors, of the plurality of core processors, for execution of system inputs/outputs (IOs) in a data storage system, wherein user IOs are executed on any of the plurality of core processors and system IOs are executed exclusively on the one or more core processors of the set, and wherein the set includes fewer than all of the plurality of core processors;
        dynamically adjust the number of core processors in the set based on a current utilization of a resource;
        schedule a system IO on a core processor of the set of core processors that has the least magnitude of scheduled utilization among the set; and
        schedule a user IO on a core processor of the plurality of core processors that has the least magnitude of scheduled utilization among the plurality of core processors.

21. The data storage system of claim 20, wherein the scheduler executed by the controller is further to:
    receive the system IO for scheduling; and
    determine that the received IO is a system IO.

22. The data storage system of claim 20, wherein the scheduler executed by the controller is further to:
    determine a corresponding magnitude of scheduled utilization for each of the plurality of core processors,
    wherein the wherein the magnitude is a product of a queue buildup and a service time, wherein the queue buildup is the number of tasks in a corresponding queue, wherein the service time is the average time to execute tasks in the corresponding queue, and wherein the magnitude is an averaged total time to execute tasks in the corresponding queue.

23. The data storage system of claim 20, wherein the scheduler executed by the controller is further to:
    determine the current utilization of the resource based on a dynamic weight of a related system IO that utilizes the resource, wherein the dynamic weight reflects the current utilization of the resource.

* * * * *